US009557508B2

(12) United States Patent
Buff et al.

(10) Patent No.: US 9,557,508 B2
(45) Date of Patent: Jan. 31, 2017

(54) CONVERTIBLE FIBER OPTIC PANEL/MODULE ASSEMBLIES FOR OPTICAL FIBER CONNECTIVITY, INCLUDING FOR WALL AND FLOOR-MOUNTED CONNECTIVITY APPLICATIONS

(71) Applicant: Corning Optical Communications LLC, Hickory, NC (US)

(72) Inventors: Scott Eaker Buff, Hickory, NC (US); Terry Lee Cooke, Hickory, NC (US); Christopher Shawn Houser, Hickory, NC (US)

(73) Assignee: Corning Optical Communications LLC, Hickory, NC (US)

(*) Notice: Subject to any disclaimer, the term of this patent is extended or adjusted under 35 U.S.C. 154(b) by 0 days.

(21) Appl. No.: 14/886,377

(22) Filed: Oct. 19, 2015

(65) Prior Publication Data

US 2016/0109676 A1    Apr. 21, 2016

Related U.S. Application Data

(60) Provisional application No. 62/066,036, filed on Oct. 20, 2014.

(51) Int. Cl.
*G02B 6/38* (2006.01)
*G02B 6/44* (2006.01)

(52) U.S. Cl.
CPC ........... *G02B 6/4471* (2013.01); *G02B 6/3897* (2013.01); *G02B 6/3825* (2013.01); *G02B 6/3885* (2013.01); *G02B 6/4446* (2013.01); *G02B 6/4466* (2013.01)

(58) Field of Classification Search
CPC ........................... G02B 6/3897; G02B 6/4452
See application file for complete search history.

(56) References Cited

U.S. PATENT DOCUMENTS

| 5,645,449 | A | * | 7/1997 | Sabo | H02G 3/18 |
| | | | | | 439/536 |
| 5,696,350 | A | | 12/1997 | Anker | |
| 6,005,189 | A | | 12/1999 | Anker | |
| 8,286,325 | B2 | * | 10/2012 | Cooke | G02B 6/4453 |
| | | | | | 29/527.2 |
| 8,428,418 | B2 | * | 4/2013 | Smrha | G02B 6/4452 |
| | | | | | 385/135 |
| 2008/0289873 | A1 | | 11/2008 | Herring et al. | |
| 2011/0147037 | A1 | | 6/2011 | Tee et al. | |

* cited by examiner

*Primary Examiner* — Omar R Rojas

(57) ABSTRACT

Convertible fiber optic panel/module assemblies for optical fiber connectivity, including for wall and floor-mounted connectivity applications are disclosed. The convertible fiber optic assemblies are configured to be convertible between a fiber optic panel assembly and a fiber optic module assembly, as desired. According to an exemplary embodiment, the convertible fiber optic panel/module assembly comprises a fiber optic panel to provide a fiber optic panel assembly. One or more fiber optic adapters are disposed through the fiber optic panel to provide fiber optic connectivity. If it is desired to convert the fiber optic panel assembly to a fiber optic module assembly, the fiber optic panel assembly is additionally fitted with a module housing having at least one rear fiber optic adapter disposed therein and a fiber optic cable harness connecting the at least one rear fiber optic adapter to the fiber optic adapters disposed in the fiber optic panel.

18 Claims, 24 Drawing Sheets

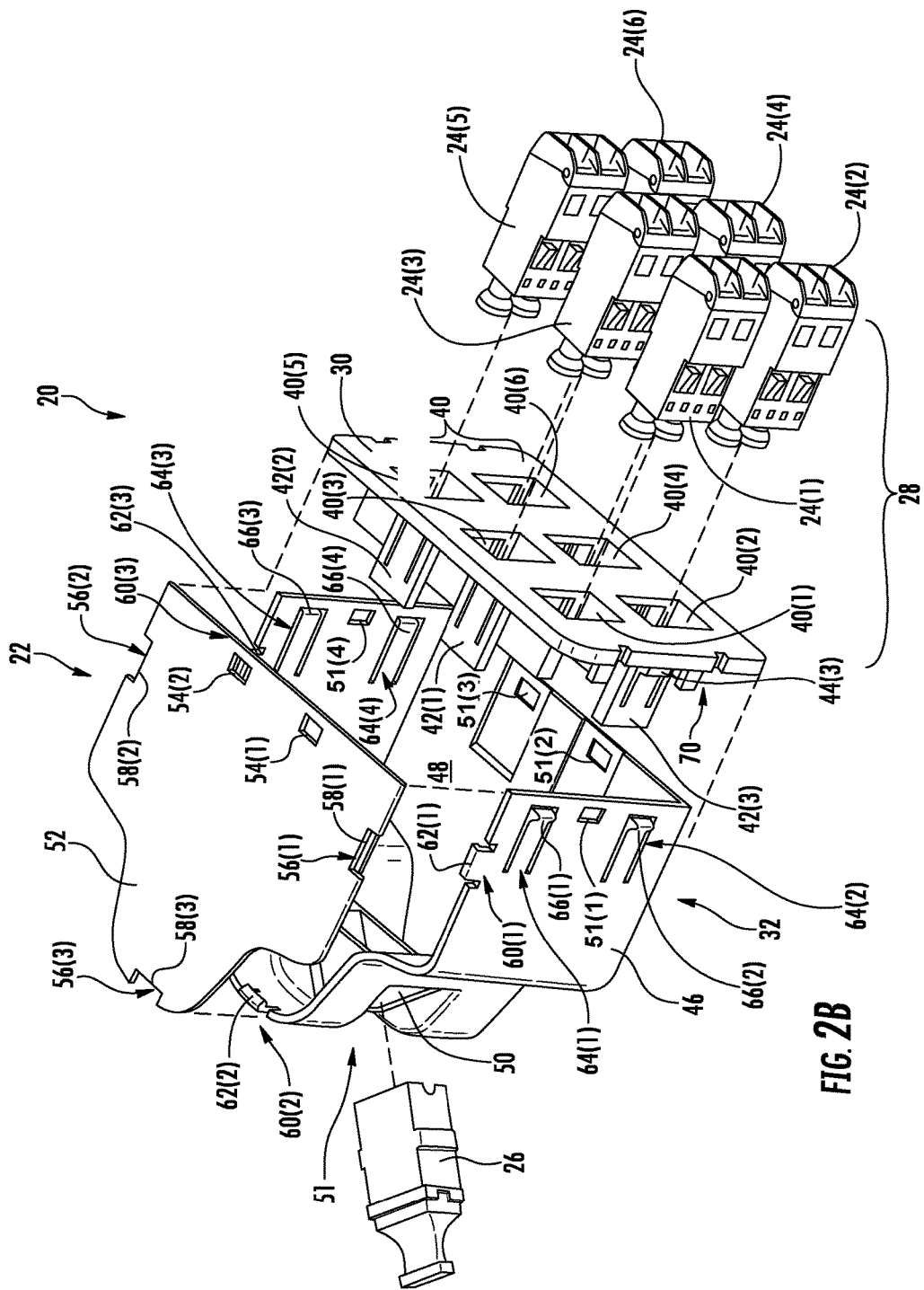

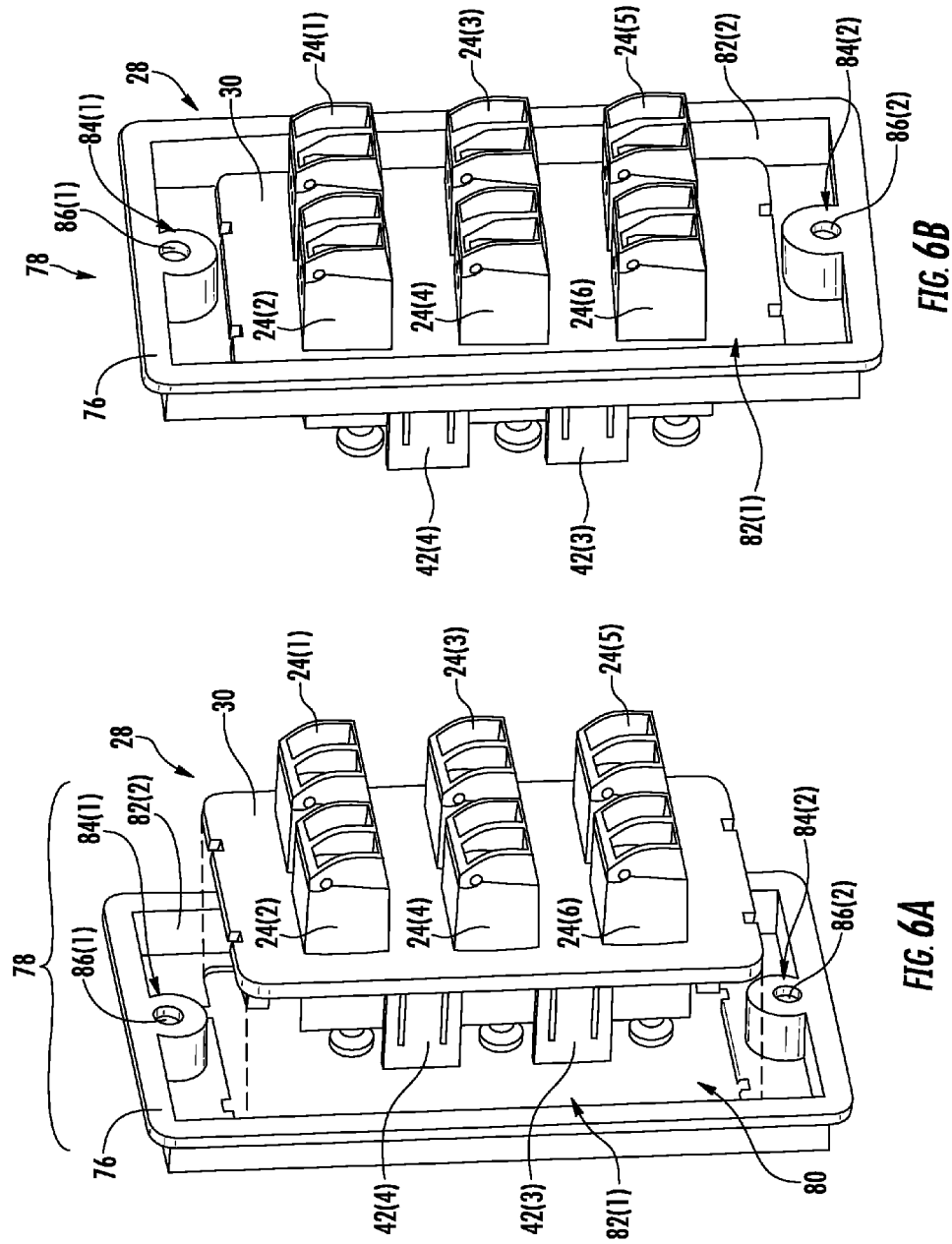

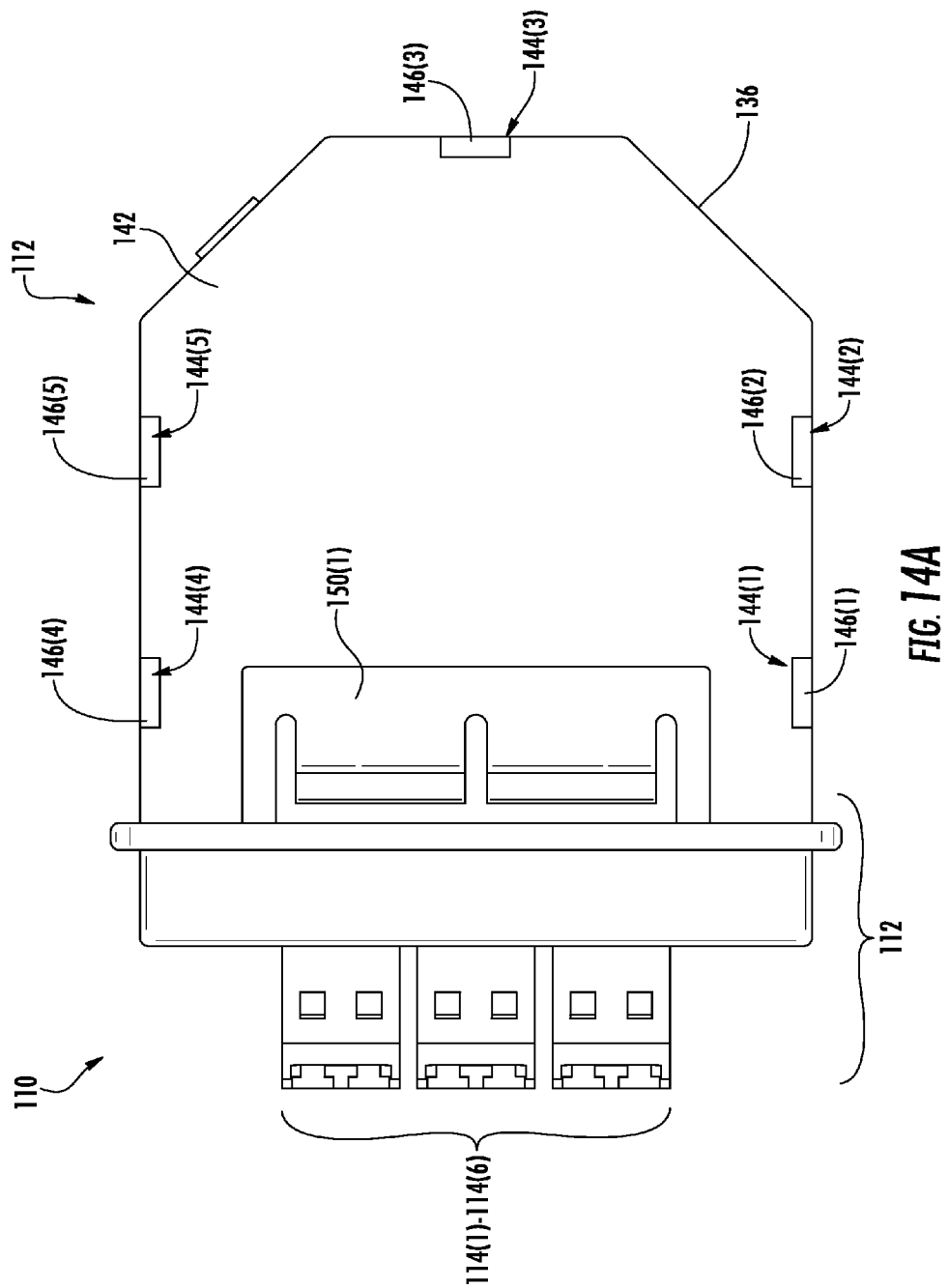

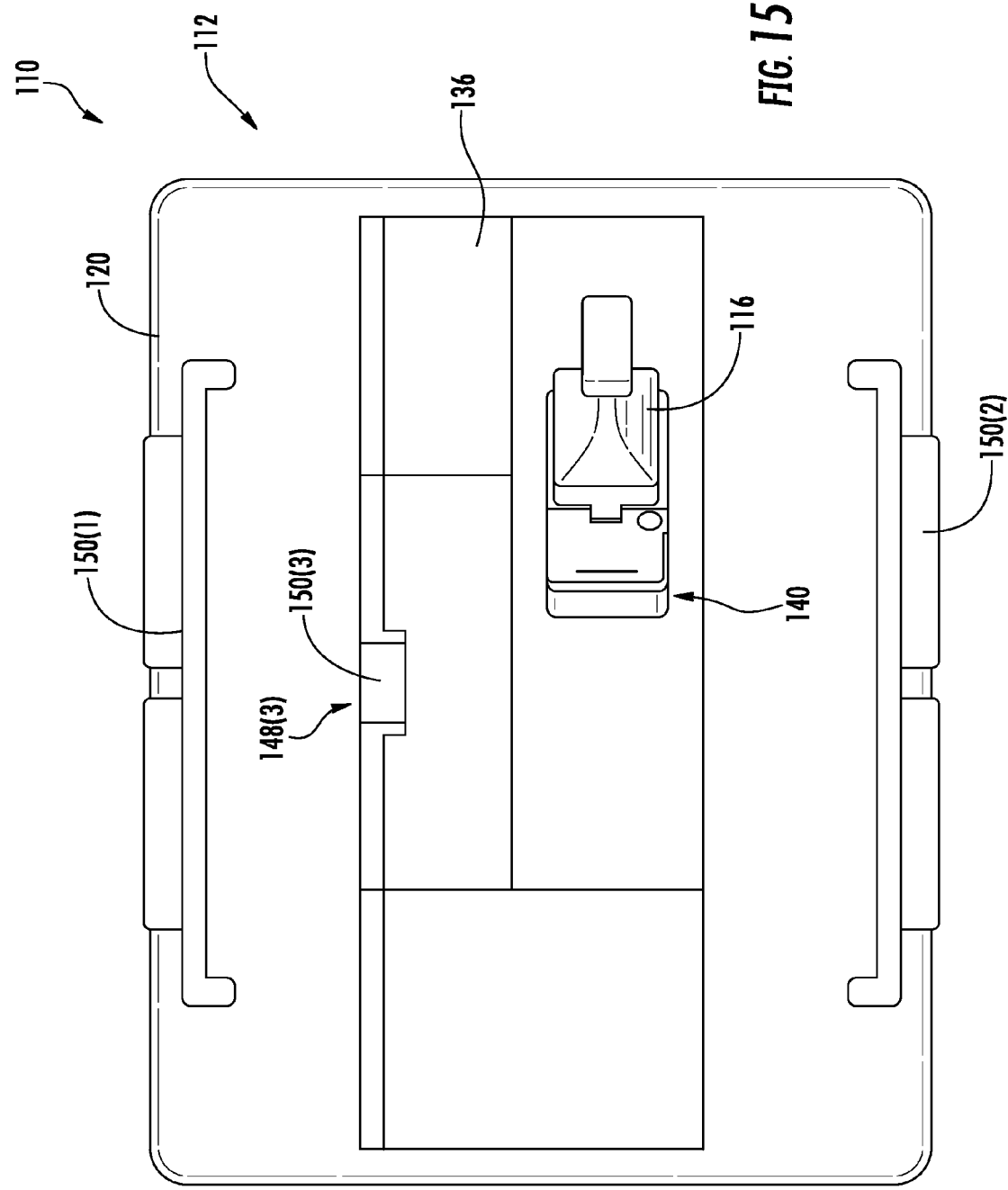

CONVERTIBLE FIBER OPTIC PANEL/MODULE ASSEMBLIES FOR OPTICAL FIBER CONNECTIVITY, INCLUDING FOR WALL AND FLOOR-MOUNTED CONNECTIVITY APPLICATIONS

PRIORITY APPLICATION

This application claims the benefit of priority under 35 U.S.C. §119 of U.S. Provisional Application Ser. No. 62/066,036 filed on Oct. 20, 2014 the content of which is relied upon and incorporated herein by reference in its entirety.

TECHNICAL FIELD

The disclosure relates generally to convertible fiber optic panel/module assemblies for optical fiber connectivity, including for wall and floor-mounted connectivity applications.

BACKGROUND

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support interconnections.

Fiber optic cables can also be extended from the fiber optic equipment to end point devices to provide fiber optic network connectivity to the end point devices. For example, an end point device may be a network card in an office computer in an office environment. In this regard, wall- and/or floor-mounted fiber optic junction boxes may be provided in a building to house a fiber optic panel to provide connectivity points between a fiber optic cable run through the interior walls or floors of a building and end point devices in the building. FIG. 1 illustrates an example of a floor-mounted junction box 10 that includes a cavity 12 for disposing a floor-mounted fiber optic panel 14 in a floor. For example, the fiber optic panel 14 illustrated in FIG. 1 contains six (6) duplex LC fiber optic adapters 16(1) -16(6) extending through a panel 18. Thus in this example, six (6) duplex connectorized legs of a fiber optic cable (not shown) can be brought into a rear side of the floor-mounted junction box 10 and connected to the backside of the duplex LC fiber optic adapters 16(1)-16(6) in the floor-mounted fiber optic panel 14. Last run fiber optic jumper cables (not shown) can be connected to the front side of the duplex LC fiber optic adapters 16(1)-16(6) extending out from the fiber optic panel 14 and to end point devices to provide optical fiber connectivity between the end point devices and the fiber optic cable. Thus, in this example, the six (6) duplex LC fiber optic adapters 16(1)-16(6) can support duplex fiber optic connectivity to up to six (6) end point devices.

Thus in summary, the paths or conduits in the interior walls and/or floors of a building to support runs of the fiber optic cable have to be large enough in diameter to support break out of multiple legs each having end fiber optic connectors. Larger diameter pull paths can be more difficult to install. It would be advantageous if fiber optic connectivity could be provided to the end point devices in a manner that would reduce or minimize the pulling path size of the fiber optic cable and provide for the desired fiber optic connectivity to end point devices.

No admission is made that any reference cited herein constitutes prior art. Applicant expressly reserves the right to challenge the accuracy and pertinency of any cited documents.

SUMMARY

Embodiments disclosed herein include convertible fiber optic panel/module assemblies for optical fiber connectivity, including for wall and floor-mounted connectivity applications. The convertible fiber optic panel/module assemblies are configured to be convertible between a fiber optic panel assembly and a fiber optic module assembly, as desired. The convertible fiber optic panel/module assemblies may be deployed in wall-mount or floor-mount junction boxes as non-limiting examples to support fiber optic connectivity. According to an exemplary embodiment, the convertible fiber optic panel/module assembly comprises a fiber optic panel to provide a fiber optic panel assembly. One or more fiber optic adapters are disposed through the fiber optic panel to provide fiber optic connectivity. The fiber optic panel may be configured to be fitted into a wall or floor junction box to provide a wall-mounted or floor-mounted fiber optic panel assembly. If it is desired to convert the fiber optic panel assembly to a fiber optic module assembly, the fiber optic panel assembly is additionally fitted with a rear module housing having at least one rear fiber optic adapter disposed therein and a fiber optic cable harness connecting the at least one rear fiber optic adapter to the fiber optic adapters disposed in the fiber optic panel. In this manner, the convertible fiber optic panel/module assembly can be compatible with the same junction box whether a fiber optic panel assembly or a fiber optic module assembly.

As a non-limiting example, the convertible fiber optic panel/module assemblies disclosed herein can allow a higher density, multi-fiber fiber optic trunk cable to be supported by a wall or floor-mounted fiber optic junction box for extending fiber optic connectivity between the fiber optic trunk cable and end point devices. Use of higher density, fiber optic trunk cable can reduce the path diameter needed for fiber optic trunk cable pulling in walls and/or floors and avoid or reduce the ganging of the multiple leg connectors in the assembly. However, with multi-fiber connector legs, a conversion back to lower density fiber optic connectors may be needed for the convertible fiber optic panel/module assembly to support fiber optic connectivity to multiple end point devices. In this regard, the convertible fiber optic panel/module assemblies are configured to be convertible between a fiber optic panel assembly and a fiber optic module assembly to support different options for fiber optic cables and related connector densities with both new and pre-existing junction boxes.

One embodiment of the disclosure relates to a convertible fiber optic panel/module assembly. The convertible fiber optic panel/module assembly comprises a fiber optic panel bracket comprised of a fiber optic panel opening, the fiber optic panel bracket configured to be mounted in a junction box. The convertible fiber optic panel/module assembly also comprises a fiber optic panel. The fiber optic panel comprises a panel body comprising one or more panel fiber optic adapter openings. The fiber optic panel also comprises one or more panel fiber optic adapters disposed in the one or more panel fiber optic adapter openings in the panel body. The panel body further comprises at least one panel attachment member configured to engage with at least one complementary attachment member disposed in the fiber optic panel bracket when the panel body is inserted into the fiber optic panel opening to provide a fiber optic panel assembly. The convertible fiber optic panel/module assembly also comprises a fiber optic module housing. The fiber optic module housing comprises a module housing body defining an internal cavity and comprising at least one module fiber optic adapter opening. The fiber optic module housing also comprises at least one module fiber optic adapter disposed in the at least one module fiber optic adapter opening in the module housing body. The fiber optic module housing also comprises at least one fiber optic cable harness disposed in the internal cavity, the at least one fiber optic cable harness having a first end connected to at least one module fiber optic adapter and a second end configured to be connected to the one or more panel fiber optic adapters. The module housing body further comprises at least one module housing attachment member configured to engage with the at least one panel attachment member of the fiber optic panel assembly to convert the fiber optic panel to a fiber optic module assembly.

An additional embodiment of the disclosure relates to a method of converting a fiber optic panel assembly to a fiber optic module assembly. The method comprises providing a fiber optic panel comprising a panel body comprising one or more panel fiber optic adapter openings, and one or more panel fiber optic adapters disposed in the one or more panel fiber optic adapter openings in the panel body. The method also comprises providing a fiber optic module housing comprising a module housing body defining an internal cavity and comprising at least one module fiber optic adapter opening, and at least one module fiber optic adapter disposed in the at least one module fiber optic adapter opening in the module housing body. The method also comprises disposing at least one fiber optic cable harness in the internal cavity. The method also comprises connecting a first end of the at least one fiber optic cable harness to the at least one module fiber optic adapter and a second end of the at least one fiber optic cable harness configured to be connected to the one or more panel fiber optic adapters. The method also comprises attaching at least one module housing attachment member of the module housing body with at least one panel attachment member of the fiber optic panel assembly to convert the fiber optic panel to a fiber optic module assembly.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2B is a front, top perspective exploded view of the convertible fiber optic panel/module assembly in FIG. 2A;

FIG. 6A is a front, side perspective view of the convertible fiber optic panel/module assembly in FIG. 2A provided as a fiber optic panel assembly and configured to be installed in a wall-mount panel bracket to be installable in a wall-mounted junction box;

FIG. 6B is the fiber optic panel assembly in FIG. 6A installed in the wall-mount panel bracket to be installable in a wall-mounted junction box;

FIG. 14A is a top view of the fiber optic module assembly in FIG. 13B with the rear module housing body fitted with the module cover;

FIG. 15 is a rear view of the fiber optic panel/module assembly in FIG. 12 with the rear module housing fitted with the module cover to provide a fiber optic module;

DETAILED DESCRIPTION

Embodiments disclosed herein include convertible fiber optic panel/module assemblies for optical fiber connectivity, including for wall and floor-mounted connectivity applications. The convertible fiber optic panel/module assemblies are configured to be convertible between a fiber optic panel assembly and a fiber optic module assembly, as desired. The convertible fiber optic panel/module assemblies may be deployed in wall-mount or floor-mount junction boxes as non-limiting examples to support fiber optic connectivity. According to an exemplary embodiment, the convertible fiber optic panel/module assembly comprises a fiber optic panel to provide a fiber optic panel assembly. One or more fiber optic adapters are disposed through the fiber optic panel to provide fiber optic connectivity. The fiber optic panel may be configured to be fitted into a wall or floor junction box to provide a wall-mounted or floor-mounted fiber optic panel assembly. If it is desired to convert the fiber optic panel assembly to a fiber optic module assembly, the fiber optic panel assembly is additionally fitted with a rear module housing having at least one rear fiber optic adapter disposed therein and a fiber optic cable harness connecting the at least one rear fiber optic adapter to the fiber optic adapters disposed in the fiber optic panel. In this manner, the convertible fiber optic panel/module assembly can be compatible with the same junction box whether a fiber optic panel assembly or a fiber optic module assembly.

Figure 1:
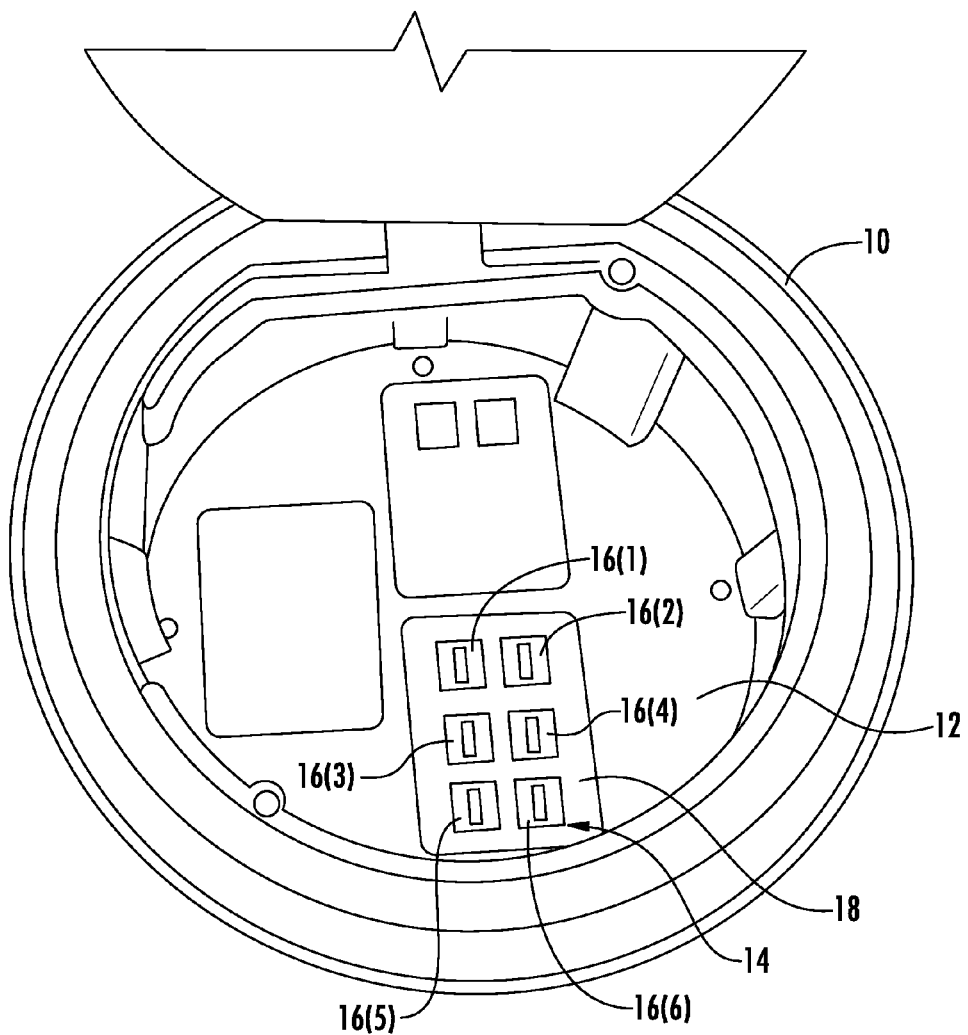
FIG. 1 is a schematic diagram of an exemplary floor-mounted junction box with a floor-mounted fiber optic panel having duplex LC fiber optic adapters for supporting fiber optic connectivity to end point devices.
Figure 2A:
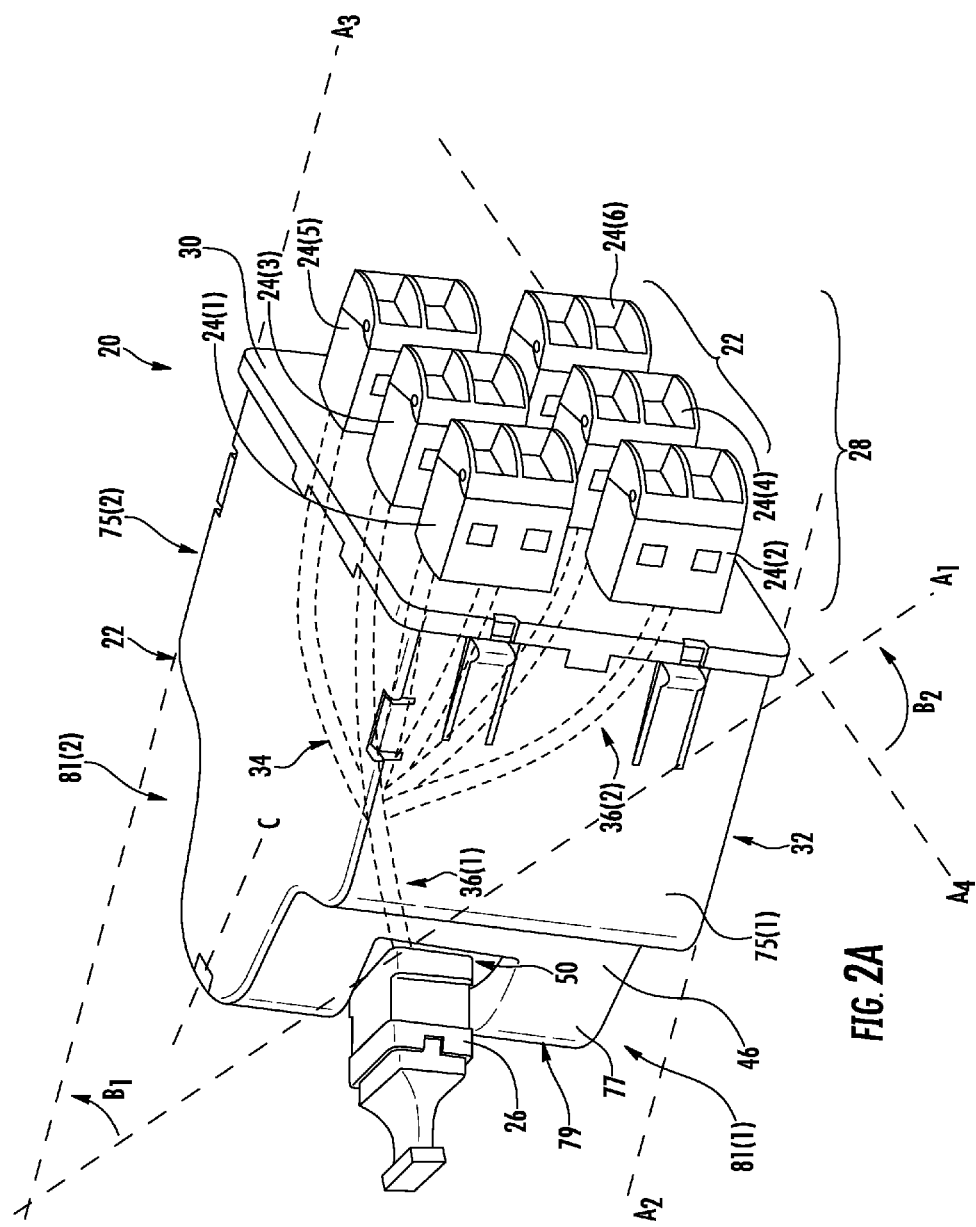
FIG. 2A is a front, top perspective view of an exemplary convertible fiber optic panel/module assembly configured to be converted from a fiber optic panel assembly to a fiber optic module assembly, and vice versa, and mounted in a floor-mounted or wall-mounted junction box.

In this regard, FIG. 2A is a front, top perspective view of an exemplary convertible fiber optic panel/module assembly 20. As will be discussed in more detail below, the convertible fiber optic panel/module assembly 20 is configured to be converted from a fiber optic panel assembly to a fiber optic module assembly, and vice versa. In FIG. 2A, the convertible fiber optic panel/module assembly 20 is configured as a fiber optic module 22. The fiber optic module 22 is configured to be mounted in a floor-mounted or wall-mounted junction box to provide fiber optic connectivity through a plurality of panel fiber optic adapters 24(1)-24(6) each connected to an optical fiber in a fiber optic cable (not shown) connected to a module fiber optic adapter 26. In this example, the convertible fiber optic panel/module assembly 20 has six (6) duplex LC panel fiber optic adapters 24(1)-24(6) to provide up to six (6) duplex fiber optic connections. The module fiber optic adapter 26 is a MTP fiber optic adapter in this example that supports twelve (12) optical fibers. Also note that more than one module fiber optic adapter 26 may be provided in the fiber optic module 12.

With continuing reference to FIG. 2A, the convertible fiber optic panel/module assembly 20 comprises a fiber optic panel 28 to provide a fiber optic panel assembly. The panel fiber optic adapters 24(1)-24(6) are disposed in a panel body 30 to provide the fiber optic panel 28. As will be discussed in more detail below, this fiber optic panel 28 is configured to be fitted into a wall or floor junction box to provide a wall-mounted or floor-mounted fiber optic panel assembly. If it is desired to convert the fiber optic panel 28 to the fiber optic module 22, the fiber optic panel 28 is additionally fitted with a fiber optic module housing 32 with the module fiber optic adapter 26 disposed in a module fiber optic adapter opening 50 disposed therein and a fiber optic cable harness 34. The fiber optic cable harness 34 is connected between the module fiber optic adapter 26 on a first end 36(1) and the panel fiber optic adapters 24(1)-24(6) disposed in the fiber optic panel 28 on a second end 36(2) of the fiber optic cable harness 34. In this manner, the convertible fiber optic panel/module assembly 20 can be converted between the fiber optic panel 28 or the fiber optic module 22, as desired.

In this example, the convertible fiber optic panel/module assembly 20 is compatible with the same junction box whether configured as a fiber optic panel 28 or the fiber optic module 22. As a non-limiting example, a floor mount junction box that can receive the fiber optic panel 28 or the fiber optic module 22 may be approximately 56 millimeters (mm) in width, 74 mm in length, and 90 mm in depth. A wall-mount junction box that can receive the fiber optic panel 28 or the fiber optic module 22 may be approximately 53 millimeters (mm) in width, 89 mm in length, and 80 mm in depth.

Figure 3:
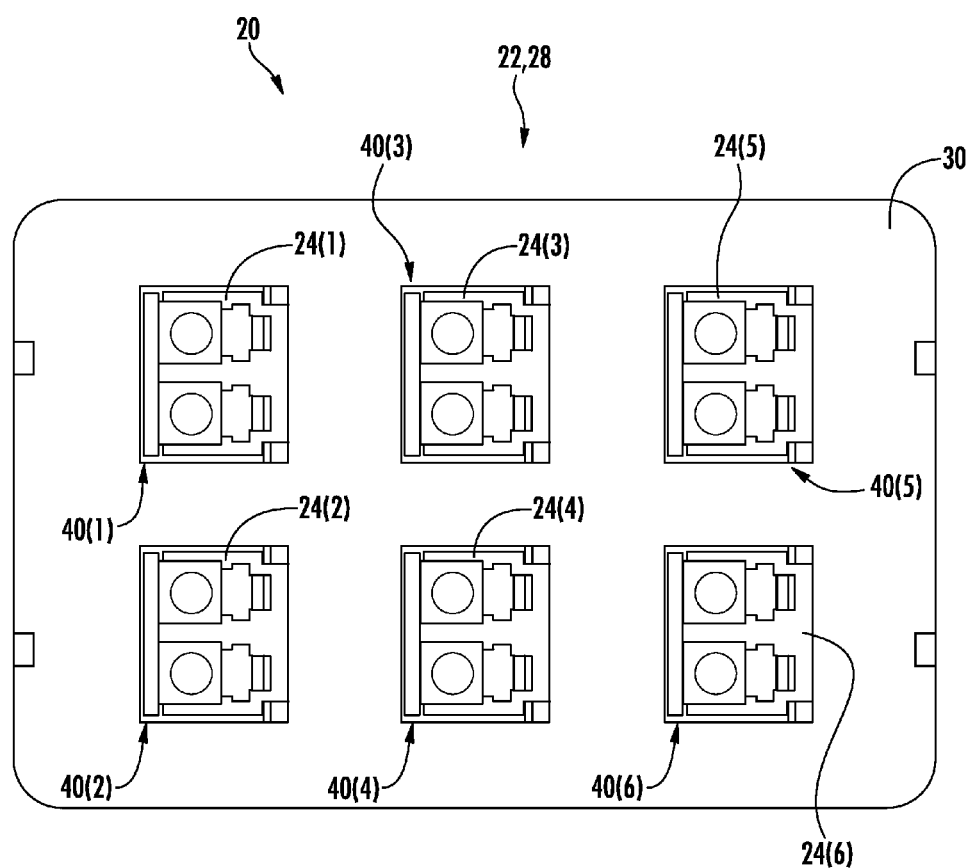
FIG. 3 is a front view of the convertible fiber optic panel/module assembly in FIG. 2A.

In this manner, as an example, the number of parts needed to provide a fiber optic panel and a fiber optic module for junction boxes may be reduced. A customer can purchase a kit of the convertible fiber optic panel/module assembly 20 to provide the fiber optic panel 28 or fiber optic module 22, as desired, and convert back and forth. FIG. 2B is a front, top perspective exploded view of the convertible fiber optic panel/module assembly 20 in FIG. 2A to provide more detail. In this regard, the convertible fiber optic panel/module assembly 20 includes the fiber optic panel 28 as previously discussed above. The fiber optic panel 28 includes a panel body 30 that includes a plurality of panel fiber optic adapter openings 40 to receive and support panel fiber optic adapters 24 in the panel fiber optic adapter openings 40. The panel body 30 may be a plastic molded part as a non-limiting example. In this example, the panel body 30 includes six (6) panel fiber optic adapter openings 40(1)-40(6) to receive the six (6) panel fiber optic adapters 24(1)-24(6). FIG. 3 is a front view of the convertible fiber optic panel/module assembly 20 in FIGS. 2A and 2B showing the front of the panel fiber optic adapters 24(1)-24(6) disposed through the panel fiber optic adapter openings 40(1)-40(6) in the panel body 30.

The panel body 30 also includes panel attachment members 42(1)-42(6) (42(4)-42(6) not shown in FIG. 2B). As will be discussed below, the panel attachment members 42(1)-42(6) are configured to engage with complementary attachment members disposed in a fiber optic panel bracket (not shown) when the panel body 30 is inserted into the fiber optic panel bracket opening to provide the fiber optic panel 28 as a fiber optic panel assembly. In this example, the panel attachment members 42(1)-42(6) are latches that each have finger portions 44(1)-44(6) (only 44(3) shown in FIG. 2B) configured to engage with latch openings.

However, if it is desired to provide the convertible fiber optic panel/module assembly 20 in FIG. 2B as the fiber optic module 22, the panel body 30 is secured to the fiber optic module housing 32. In this regard, the panel attachment members 42(1)-42(6) are inserted into a module housing body 46 that defines an internal cavity 48 and a module fiber optic adapter opening 50 disposed in a rear side 51 of the module housing body 46. The module housing body 46 may be a plastic molded part as a non-limiting example. The module fiber optic adapter 26 may already be disposed in the module fiber optic adapter opening 50 of the module housing body 46 before the module housing body 46 receives the fiber optic panel 28. The fiber optic cable harness 34 (shown in FIG. 2A) is disposed in the internal cavity 48 to connect the module fiber optic adapter 26 to the panel fiber optic adapters 24(1)-24(6). The module housing body 46 contains a plurality of latch openings 51(1)-51(4) as module attachment members that are configured to receive a respective finger portion 44(3)-44(6) of the panel attachment members 42(3)-42(6) to receive the fiber optic panel 28 and secure the module housing body 46 to the rear of the panel body 30 to convert the fiber optic panel 28 to the fiber optic module 22. An optional module cover 52 containing latch openings 54(1)-54(2) in this example can also be provided and secured to the panel attachment members 42(1)-42(2) of the fiber optic panel 28 to fully enclose the fiber optic module 22, if desired. The module cover 52 also includes additional module cover attachment members 56(1)-56(3) in the form of latch openings 58(1)-58(3) that are configured to receive module cover housing attachment members 60(1)-60(3) in the form of latch fingers 62(1)-62(3) disposed in the module housing body 46 to additionally secure the module cover 52 to the module housing body 46.

Figure 4:
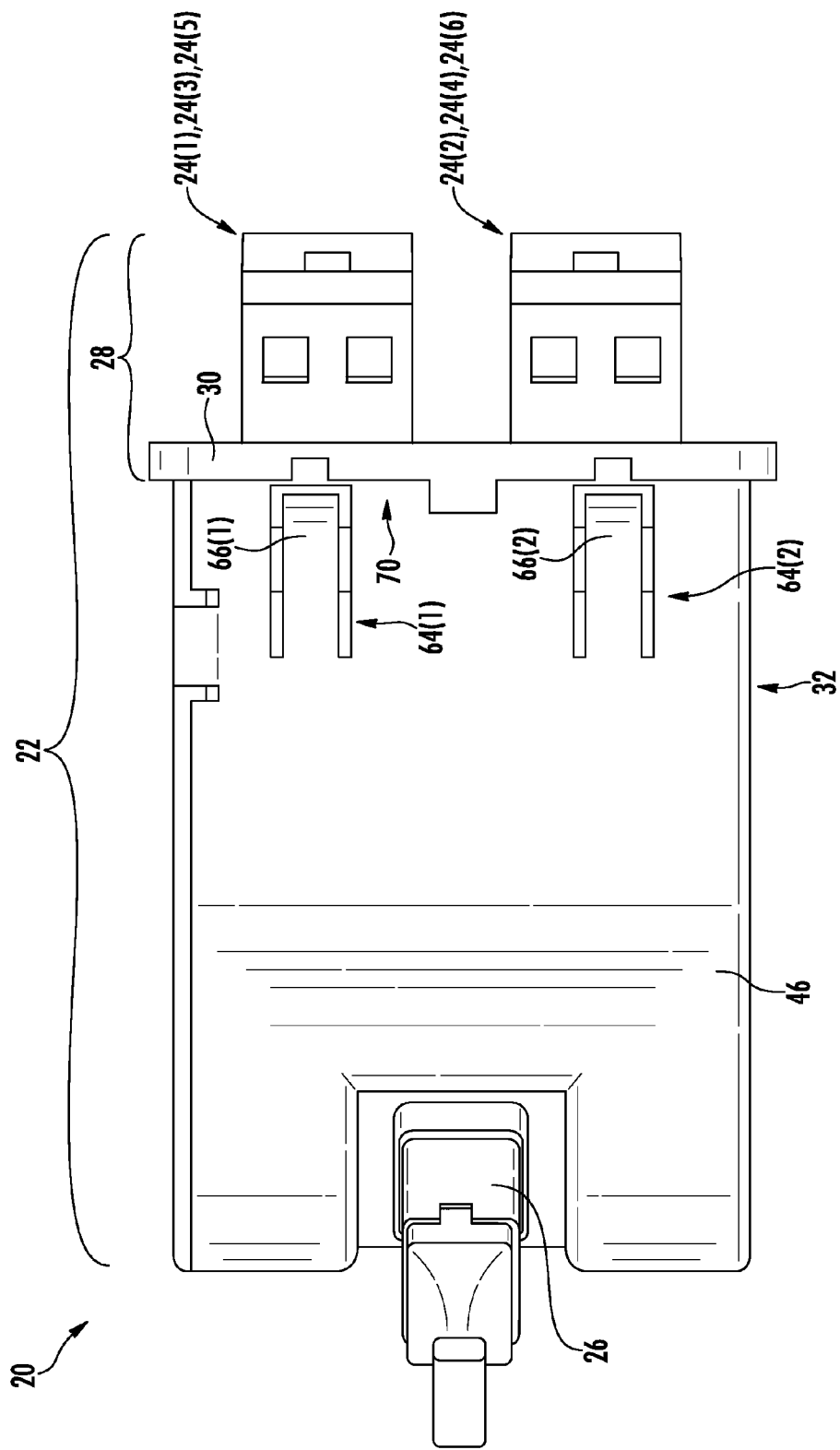
FIG. 4 is a side view of the convertible fiber optic panel/module assembly in FIG. 2A provided as a fiber optic module assembly.
Figure 7A:
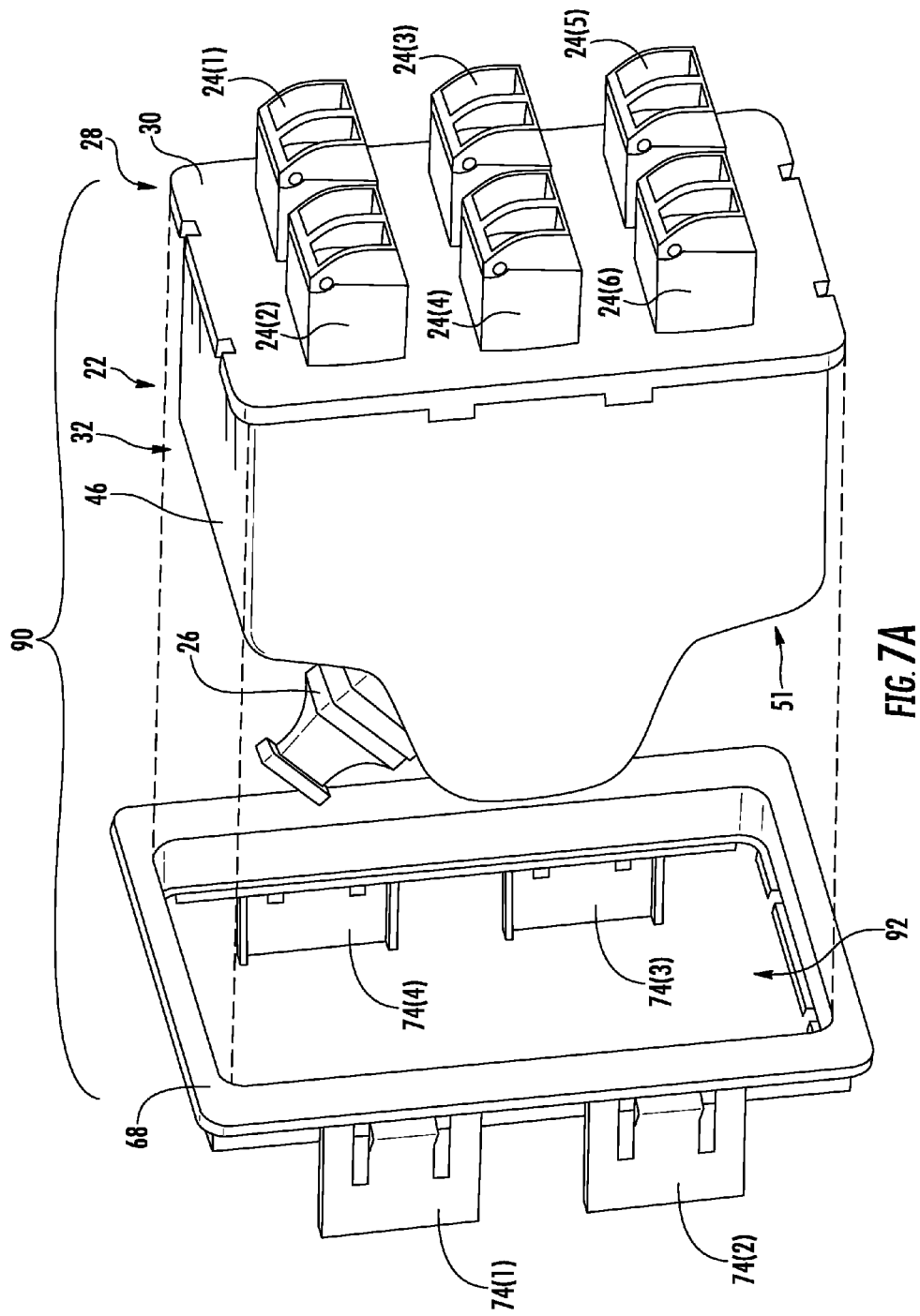
FIG. 7A is a front, side perspective view of the convertible fiber optic panel/module assembly in FIG. 2A provided as a fiber optic module assembly and configured to be installed in a floor-mount panel adapter bracket to be installable in a floor-mounted junction box.

Further, with continuing reference to FIG. 2B, the module housing body 46 also contains attachment members 64(1)-64(4) in the form of latch fingers 66(1)-66(4) that are configured to engage a fiber optic panel bracket to secure the module housing body 46 to the fiber optic panel bracket, as discussed in more detail below with regard to FIGS. 7A-8. FIG. 4 is a side view of the convertible fiber optic panel/module assembly 20 in FIG. 2A showing the latch fingers 66(1)-66(4) (only latch fingers 66(1), 66(2) shown in FIG. 2A) of the module housing body 46 engaged with the panel body 30 to secure the module housing body 46 to the panel body 30 to provide the fiber optic module 22. Like the fiber optic panel 28, as will be discussed in more detail below, the fiber optic module 22 in FIGS. 2A and 2B is also configured to be fitted into a wall or floor junction box to provide a wall-mounted or floor-mounted fiber optic module assembly.

Figure 5B:
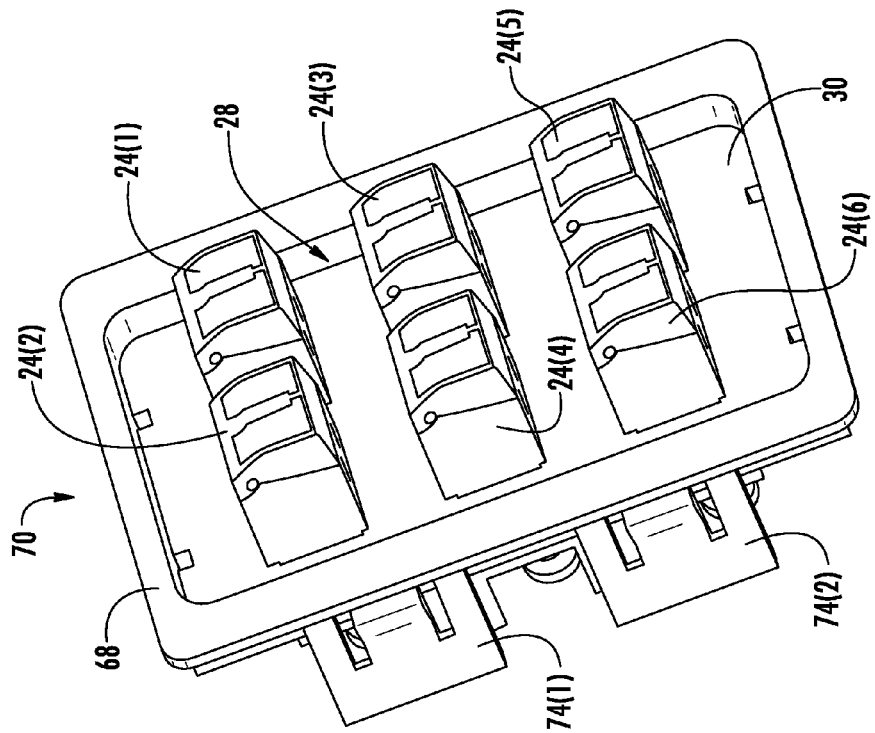
FIG. 5B is the convertible fiber optic panel/module assembly in FIG. 5A installed in the floor-mount panel bracket to be installable in a floor-mounted junction box.
Figure 5A:
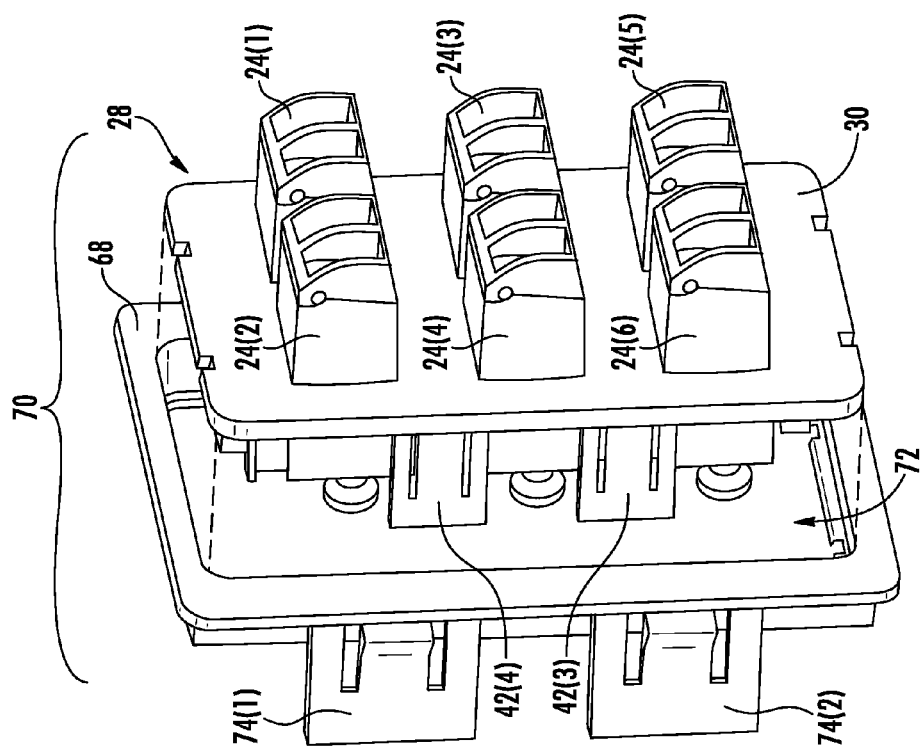
FIG. 5A is a front, side perspective view of the convertible fiber optic panel/module assembly in FIG. 2A provided as a fiber optic panel assembly and configured to be installed in a floor-mount panel bracket to be installable in a floor-mounted junction box.

As discussed above, if the convertible fiber optic panel/module assembly 20 in FIGS. 2A and 2B is desired to be provided as the fiber optic panel 28, and it is desired to floor- or wall-mount the fiber optic panel 28, the fiber optic panel 28 can be disposed in a floor-mount or wall-mount fiber optic panel bracket. In this regard, FIG. 5A is a front, side perspective view of the convertible fiber optic panel/module assembly 20 in FIG. 2A configured to be installed in a floor-mount fiber optic panel bracket 68 to be installable in a floor-mounted junction box as a fiber optic panel assembly 70. FIG. 5B is the fiber optic panel 28 in FIG. 5A fully installed in the floor-mount fiber optic panel bracket 68 to be installable in a floor-mounted junction box as the fiber optic panel assembly 70. In this regard, the floor-mount fiber optic panel bracket 68 contains a fiber optic panel opening 72, as shown in FIG. 5A. The attachment members 42(1)-42(4) (only attachment members 42(3), 42(4) shown in FIG. 5A) of the panel body 30 are each configured to engage with complementary attachment members (shown in FIG. 7A) disposed in the floor-mount fiber optic panel bracket 68 when the panel body 30 is inserted into the fiber optic panel opening 72 to provide the fiber optic panel assembly 70. The floor-mount fiber optic panel bracket 68 with the fiber optic panel 28 disposed therein is configured to be mounted in a floor-mount junction box to floor-mount the fiber optic panel assembly 70. In this regard, the floor-mount fiber optic panel bracket 68 contains attachment members 74(1)-74(4) (74(1)-74(2) shown in FIGS. 5A and 5B) that are configured to be secured to complementary attachment members inside a floor-mount junction box (not shown) to secure the fiber optic panel assembly 70 to the floor-mount junction box.

With reference back FIG. 2A, to provide enhanced access to the module fiber optic adapter 26 for connecting a fiber optic connector thereto to provide fiber optic connectivity to the fiber optic module 22, in this example, the module fiber optic adapter opening 50 is disposed in the module housing body 46 at non-parallel and non-perpendicular angles. The module fiber optic adapter opening 50 is disposed at non-parallel angle $\beta_1$ along plane $A_1$ to planes $A_2$, $A_3$ of sides 75(1), 75(2), respectively, of the module housing body 46. Also in this example, the module fiber optic adapter opening 50 is disposed in the module housing body 46 of fiber optic module housing 32 at a non-perpendicular and non-parallel angle $\beta_2$ with respect to the panel body 30. Also in this example, the module fiber optic adapter opening 50 is disposed in a curved rear surface 77 in a rear side 79 of a module housing body 46 of the fiber optic module housing 32. The curved rear surface 77 is disposed between the sides 75(1), 75(2) of the module housing body 46. In this manner, open areas 81(1), 81(2) are formed on each side of the center axis C of the curved rear surface 77 to allow for enhanced access to the module fiber optic adapter 26 and to provide a recessed area for any slack fiber optic cable desired such that the fiber optic module 22 can still fit properly within a junction box.

Further, as discussed above, if the convertible fiber optic panel/module assembly 20 in FIGS. 2A and 2B is desired to be provided as the fiber optic panel 28, and it is desired to wall-mount the fiber optic panel 28, the fiber optic panel 28 can be disposed in a wall-mount fiber optic panel bracket. In this regard, FIG. 6A is a front, side perspective view of the convertible fiber optic panel/module assembly 20 in FIG. 2A configured to be installed in a wall-mount fiber optic panel bracket 76 to be installable in a wall-mounted junction box as a fiber optic panel assembly 78. FIG. 6B is the fiber optic panel 28 in FIG. 6A fully installed in the wall-mount fiber optic panel bracket 76 to be installable in a wall-mounted junction box as the fiber optic panel assembly 78. In this regard, the wall-mount fiber optic panel bracket 76 contains a fiber optic panel opening 80, as shown in FIG. 6A. The panel body 30 is configured to friction fit within the fiber optic panel opening 80 against side walls 82(1), 82(2) of the wall-mount fiber optic panel bracket 76 when the panel body 30 is inserted into the fiber optic panel opening 80 to provide the fiber optic panel assembly 78. The wall-mount fiber optic panel bracket 76 with the fiber optic panel 28 disposed herein is configured to be mounted in a wall-mount junction box to wall-mount the fiber optic panel assembly 78. In this regard, the wall-mount fiber optic panel bracket 76 contains attachment members 84(1), 84(2) in the form of fastener openings 86(1), 86(2) that are configured to be secured to complementary attachment members inside a wall-mount junction box (not shown) to secure the fiber optic panel assembly 78 to the wall-mount junction box.

Further, as also discussed above, if the convertible fiber optic panel/module assembly 20 in FIGS. 2A and 2B is desired to be provided as the fiber optic module 22, and it is desired to floor- or wall-mount the fiber optic module 22, the fiber optic module 22 can be disposed in a floor-mount or wall-mount fiber optic panel bracket. In this regard, FIG. 7A is a front, side perspective view of the convertible fiber optic panel/module assembly 20 in FIG. 2A configured as a fiber optic module 22 to be installed in the floor-mount fiber optic panel bracket 68 to be installable in a floor-mounted junction box as a fiber optic module assembly 90. In this example, the floor-mount fiber optic panel bracket 68 is the same bracket as the floor-mount fiber optic panel bracket 68 in FIGS. 5A and 5B. In this manner, the same floor-mount fiber optic panel bracket 68 can be used to floor-mount the convertible fiber optic panel/module assembly 20 whether configured as the fiber optic panel 28 or the fiber optic module 22.

Figure 7B:
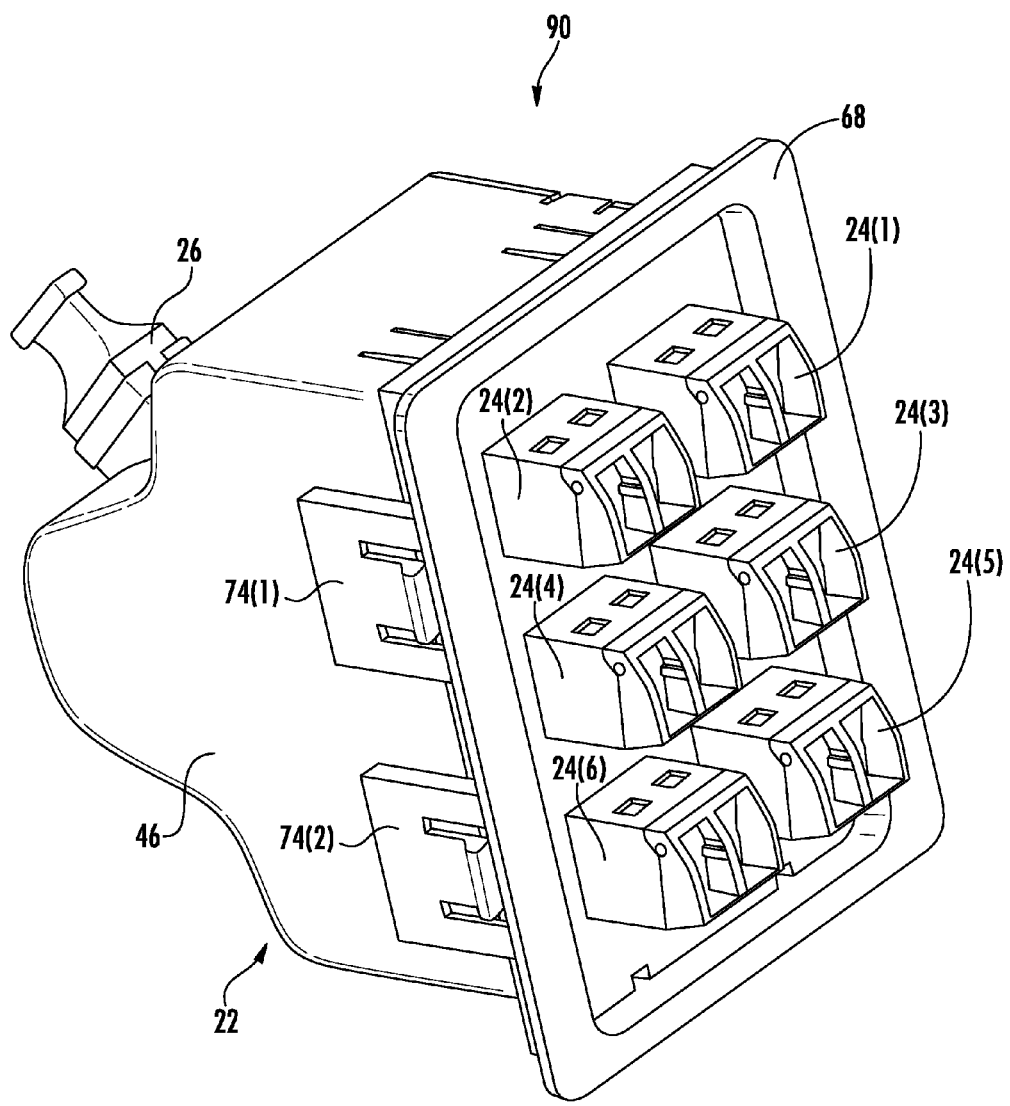
FIG. 7B is the fiber optic module assembly in FIG. 7A installed in the floor-mount panel adapter bracket to be installable in a floor-mounted junction box.
Figure 8:
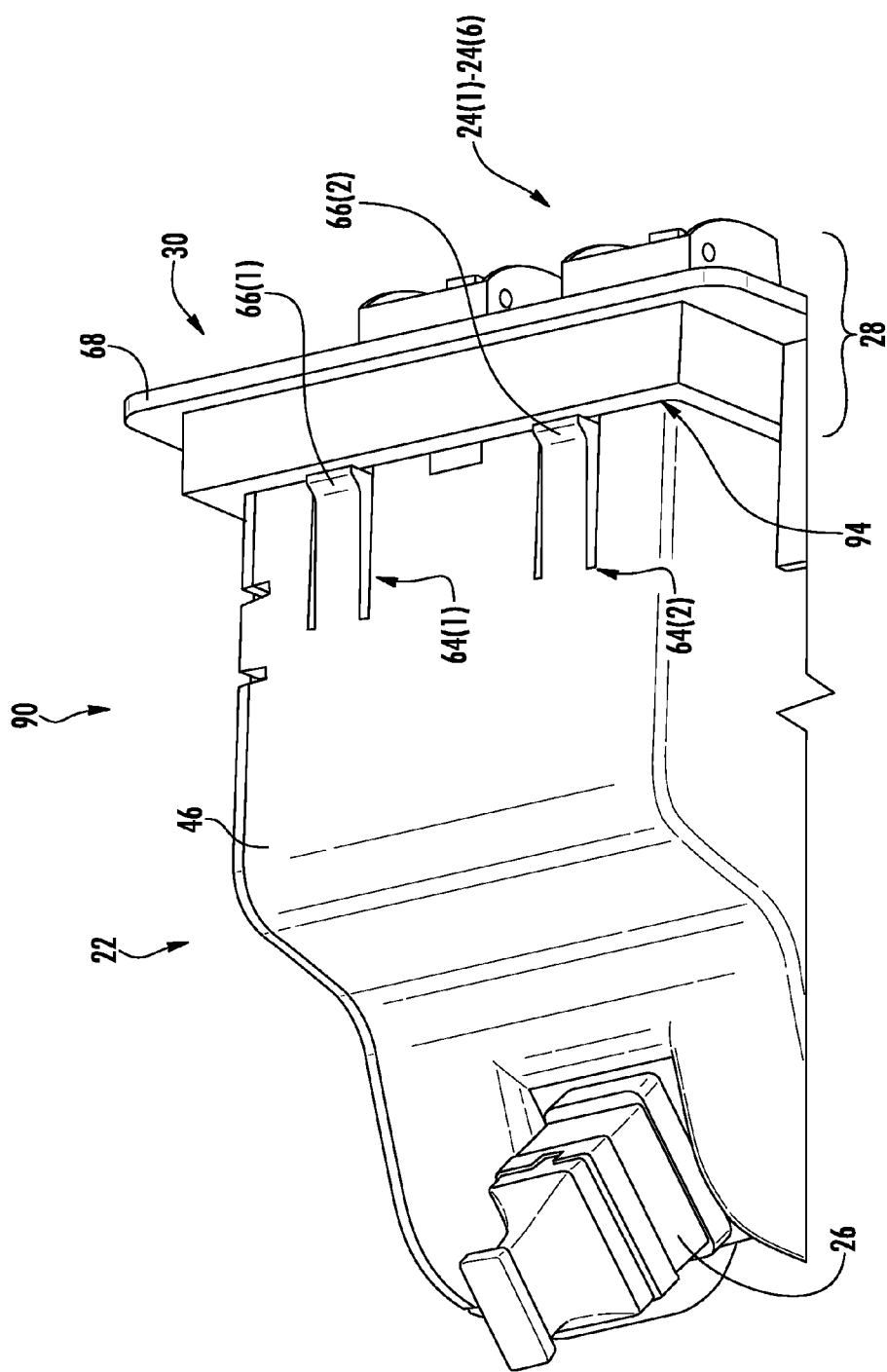
FIG. 8 is a top, side perspective view of the fiber optic module assembly in FIG. 7B installed in the floor-mount panel adapter bracket.

FIG. 7B is the fiber optic module 22 in FIG. 5B fully installed in the floor-mount fiber optic panel bracket 68 to be installable in a floor-mounted junction box as the fiber optic module assembly 90. In this regard, the floor-mount fiber optic panel bracket 68 contains a fiber optic panel opening 92, as shown in FIG. 7A. The fiber optic module 22 is inserted into the fiber optic panel opening 92 to secure the fiber optic module 22 to the fiber optic panel bracket 68 to provide the fiber optic module assembly 90. FIG. 8 is a top, side perspective view of the fiber optic module assembly 90 in FIG. 7B installed in the floor-mount fiber optic panel bracket 68 to show further detail on how the fiber optic module 22 is secured to the floor-mount fiber optic panel bracket 68 in this example. As shown in FIG. 8, the latch fingers 66(1)-66(4) (66(1), 66(2) shown in FIG. 8) of attachment members 64(1)-64(2) (see also FIG. 2B) extend outward when they clear a rear side 94 of the floor-mount fiber optic panel bracket 68 to secure the fiber optic module 22 to the floor-mount fiber optic panel bracket 68.

Figure 9A:
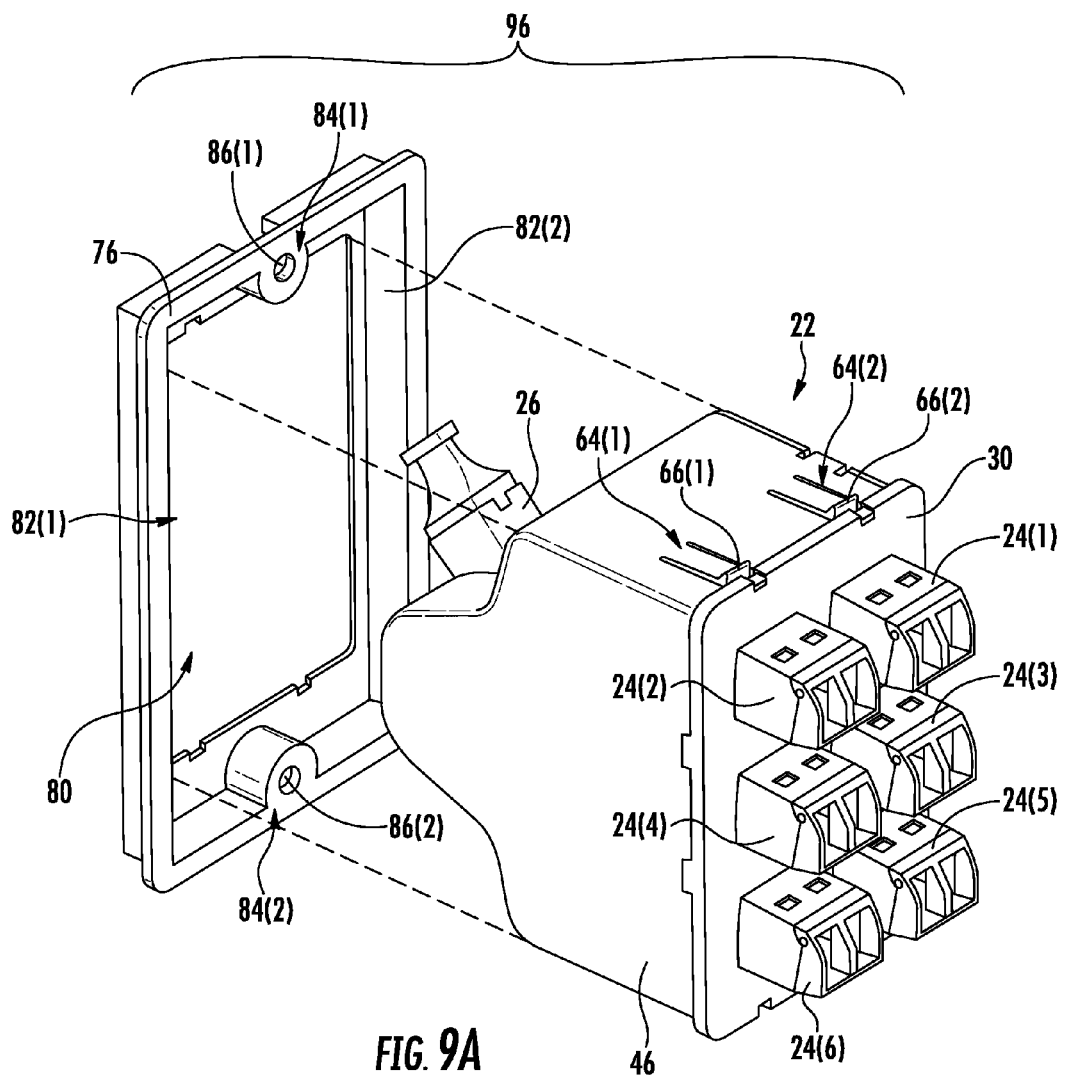
FIG. 9A is a front, side perspective view of the convertible fiber optic panel/module assembly in FIG. 2A provided as a fiber optic module assembly and configured to be installed in a wall-mount panel adapter bracket to be installable in a wall-mounted junction box.

Further, as discussed above, if the convertible fiber optic panel/module assembly 20 in FIGS. 2A and 2B is desired to be provided as the fiber optic module 22, and it is desired to wall-mount the fiber optic module 22, the fiber optic module 22 can be disposed in a wall-mount fiber optic panel bracket. In this regard, FIG. 9A is a front, side perspective view of the fiber optic module 22 in FIG. 2A configured to be installed in a wall-mount fiber optic panel bracket 76 to be installable in a wall-mounted junction box as a fiber optic module assembly 96. In this example, the wall-mount fiber optic panel bracket 76 in FIG. 9A is the same bracket as the wall-mount fiber optic panel bracket 76 in FIGS. 6A and 6B. In this manner, the same wall-mount fiber optic panel bracket 76 can be used to wall-mount the convertible fiber optic panel/module assembly 20 whether configured as the fiber optic panel 28 or the fiber optic module 22.

Figure 9B:
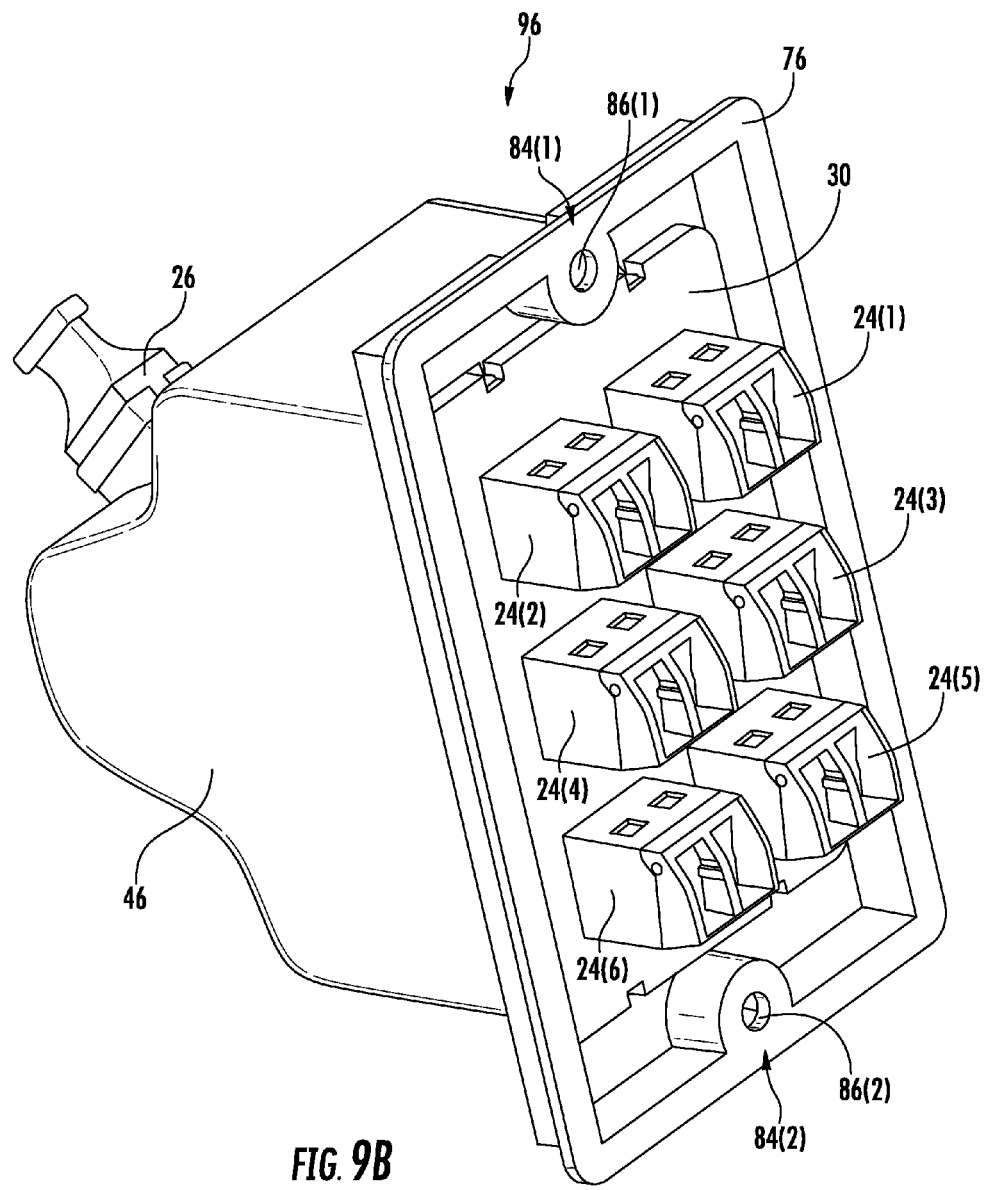
FIG. 9B is the fiber optic module assembly in FIG. 9A installed in the wall-mount panel adapter bracket to be installable in a wall-mounted junction box.

FIG. 9B is the fiber optic module 22 in FIG. 9A fully installed in the wall-mount fiber optic panel bracket 76 to be installable in a wall-mounted junction box as the fiber optic module assembly 96. In this regard, the wall-mount fiber optic panel bracket 76 contains the fiber optic panel opening 80, as shown in FIG. 9A. The module housing body 46 is configured to friction fit within the fiber optic panel opening 80 against side walls 82(1), 82(2) of the wall-mount fiber optic panel bracket 76 when the module housing body 46 is inserted into the fiber optic panel opening 80 to provide the fiber optic module assembly 96. The wall-mount fiber optic panel bracket 76 with the fiber optic module 22 disposed therein is configured to be mounted in a wall-mount junction box to wall-mount the fiber optic module assembly 96. In this regard, the wall-mount fiber optic panel bracket 76 contains the previously discussed attachment members 84(1), 84(2) in the form of the fastener openings 86(1), 86(2) that are configured to be secured to complementary attachment members inside a wall-mount junction box (not shown) to secure the fiber optic module assembly 96 to the wall-mount junction box.

Figure 10:
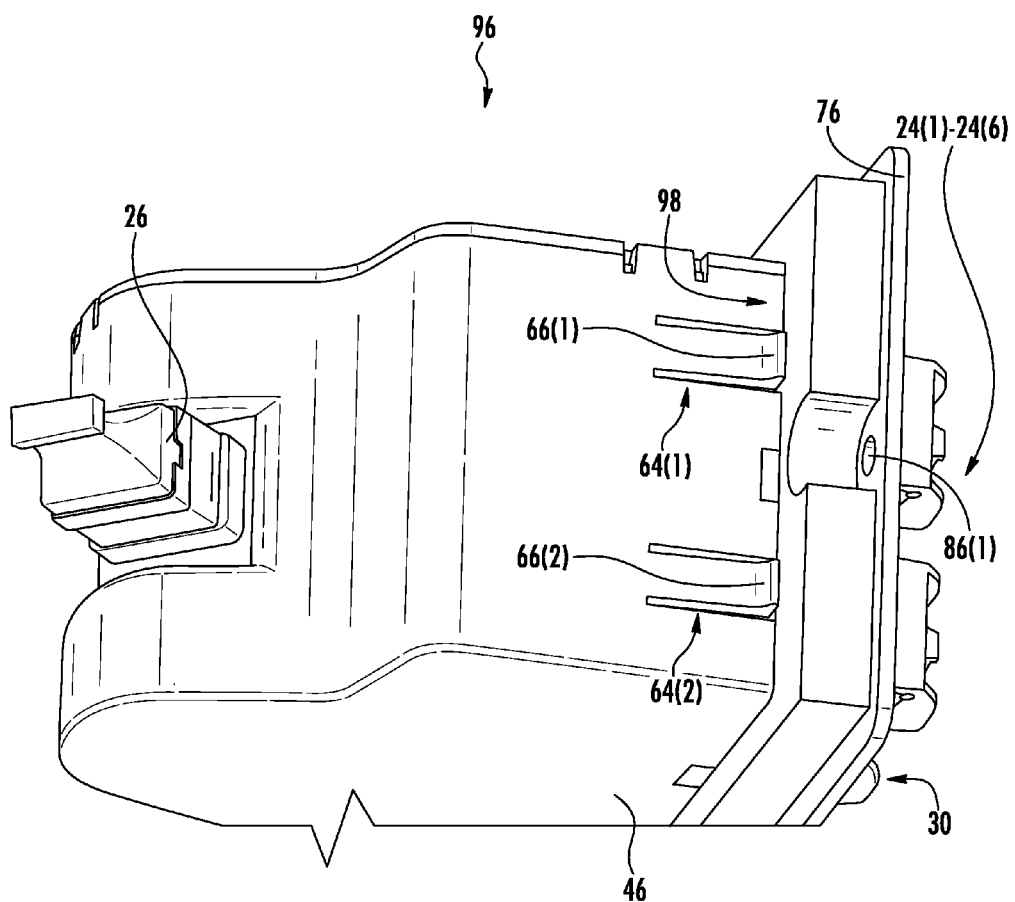
FIG. 10 is a bottom, side perspective view of the fiber optic module assembly in FIG. 9B installed in the wall-mount panel adapter bracket.

FIG. 10 is a top, side perspective view of the fiber optic module assembly 96 in FIG. 9B installed in the wall-mount fiber optic panel bracket 76 to show further detail on how the fiber optic module 22 is secured to the wall-mount fiber optic panel bracket 76 in this example. As shown in FIG. 10, the latch fingers 66(1)-66(4) (66(1), 66(2) shown in FIG. 10) of attachment members 64(1)-64(2) (see also FIG. 2B) extend outward when they clear a rear side 98 of the wall-mount fiber optic panel bracket 76 to secure the fiber optic module 22 to the wall-mount fiber optic panel bracket 76.

Figure 11:
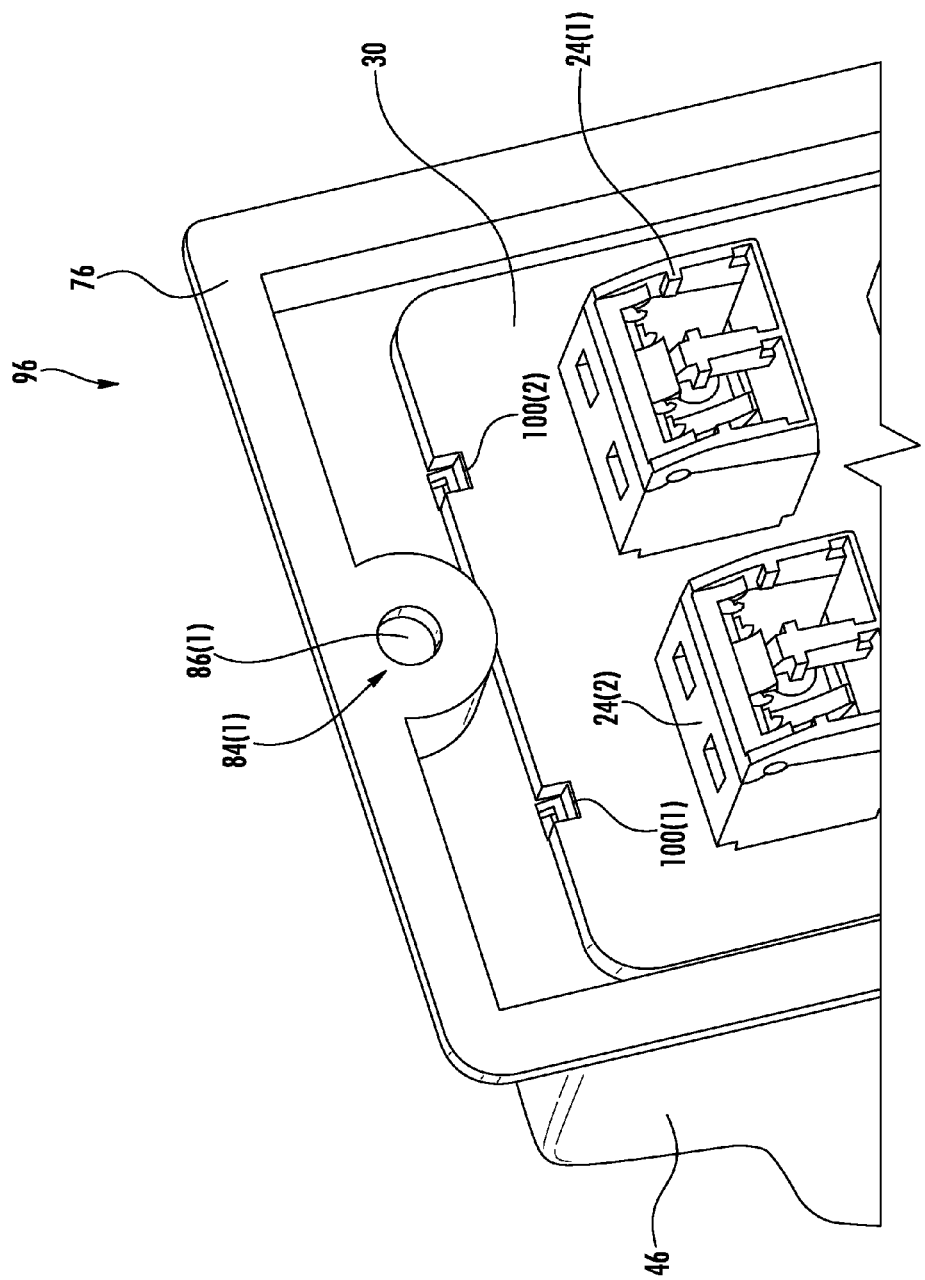
FIG. 11 is a close-up, partial front, side perspective view of the fiber optic module assembly in FIG. 9B installed in the wall-mount panel adapter bracket and illustrating front side access openings to remove the fiber optic module assembly from the wall-mount panel adapter bracket.

If and when it is desired to remove the fiber optic module 22 from the wall-mount fiber optic panel bracket 76, the fiber optic module 22 can simply be removed from the wall-mount fiber optic panel bracket 76. The wall-mount fiber optic panel bracket 76 can be used for another fiber optic module 22 or fiber optic panel 28. Also, the module housing body 46 can be removed from the panel body 30 to convert the fiber optic module 22 back to a fiber optic panel 28. FIG. 11 is a close-up, partial front, side perspective view of the fiber optic module assembly 96 in FIG. 9B installed in the wall-mount fiber optic panel bracket 76 and illustrating optional side access openings 100(1), 100(2) disposed in the panel body 30. The side access openings 100(1), 100(2) can assist in the removal of the fiber optic module 22 from the wall-mount fiber optic panel bracket 68. For example, a pulling member, such as a screwdriver or other insert device, can be inserted into the side access openings 100(1), 100(2) disposed in the panel body 30 to latch to the panel body 30 to pull the panel body 30 and module housing body 46 from the wall-mount fiber optic panel bracket 76.

Figure 12:
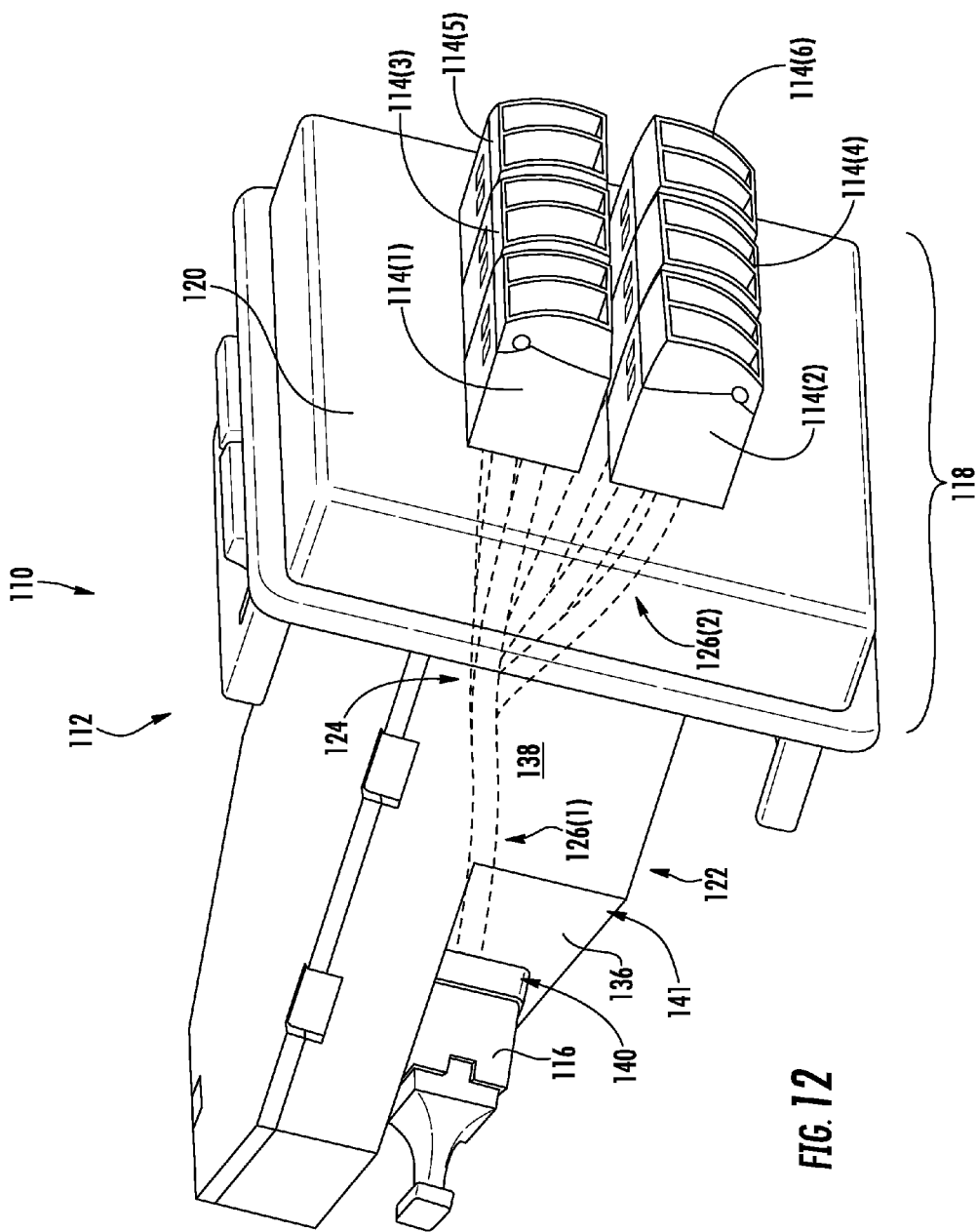
FIG. 12 is a front, side perspective view of another exemplary convertible fiber optic panel/module assembly configured to be converted from a fiber optic panel assembly to a fiber optic module assembly, and vice versa, and mounted in a floor-mounted or wall-mounted junction box.

Alternative convertible fiber optic panel/module assemblies are also possible that allow for a fiber optic panel to be converted into a fiber optic module, and vice versa, for use including floor mounting and/or wall mounting. In this regard, FIG. 12 is a front, top perspective view of another exemplary convertible fiber optic panel/module assembly 110. As will be discussed in more detail below, the convertible fiber optic panel/module assembly 110 is configured to be converted from a fiber optic panel assembly to a fiber optic module assembly, and vice versa. In FIG. 12, the convertible fiber optic panel/module assembly 110 is configured as a fiber optic module 112. The fiber optic module 112 is also configured to be mounted in a floor-mounted or wall-mounted junction box to provide fiber optic connectivity through a plurality of panel fiber optic adapters 114(1)-114(6) each connected to an optical fiber in a fiber optic cable (not shown) connected to a module fiber optic adapter 116. In this example, the convertible fiber optic panel/module assembly 110 also has six (6) duplex LC panel fiber optic adapters 114(1)-114(6) to provide up to six (6) duplex fiber optic connections, but such type and number of fiber optic adapters is not limiting. The module fiber optic adapter 116 is a MTP fiber optic adapter in this example that supports twelve (12) optical fibers in this example.

With continuing reference to FIG. 12, the convertible fiber optic panel/module assembly comprises a fiber optic panel 118 to provide a fiber optic panel assembly. The panel fiber optic adapters 114(1)-114(6) are disposed in a panel body 120 to provide the fiber optic panel 118. As will be discussed in more detail below, this fiber optic panel 118 is configured to be fitted into a wall or floor junction box to provide a wall-mounted or floor-mounted fiber optic panel assembly. If it is desired to convert the fiber optic panel 118 to the fiber optic module 112, the fiber optic panel 118 is additionally fitted with a fiber optic module housing 122 with the module fiber optic adapter 116 therein and a fiber optic cable harness 124. The fiber optic cable harness 124 is connected between the module fiber optic adapter 116 on a first end 126(1) and the panel fiber optic adapters 114(1)-114(6) disposed in the fiber optic panel 118 on a second end 126(2) of the fiber optic cable harness 124. In this manner, the convertible fiber optic panel/module assembly 110 can be converted between the fiber optic panel 118 or the fiber optic module 112, as desired. In this example, the convertible fiber optic panel/module assembly 110 is compatible with the same junction box whether configured as a fiber optic panel 118 or the fiber optic module 112.

Figure 13A:
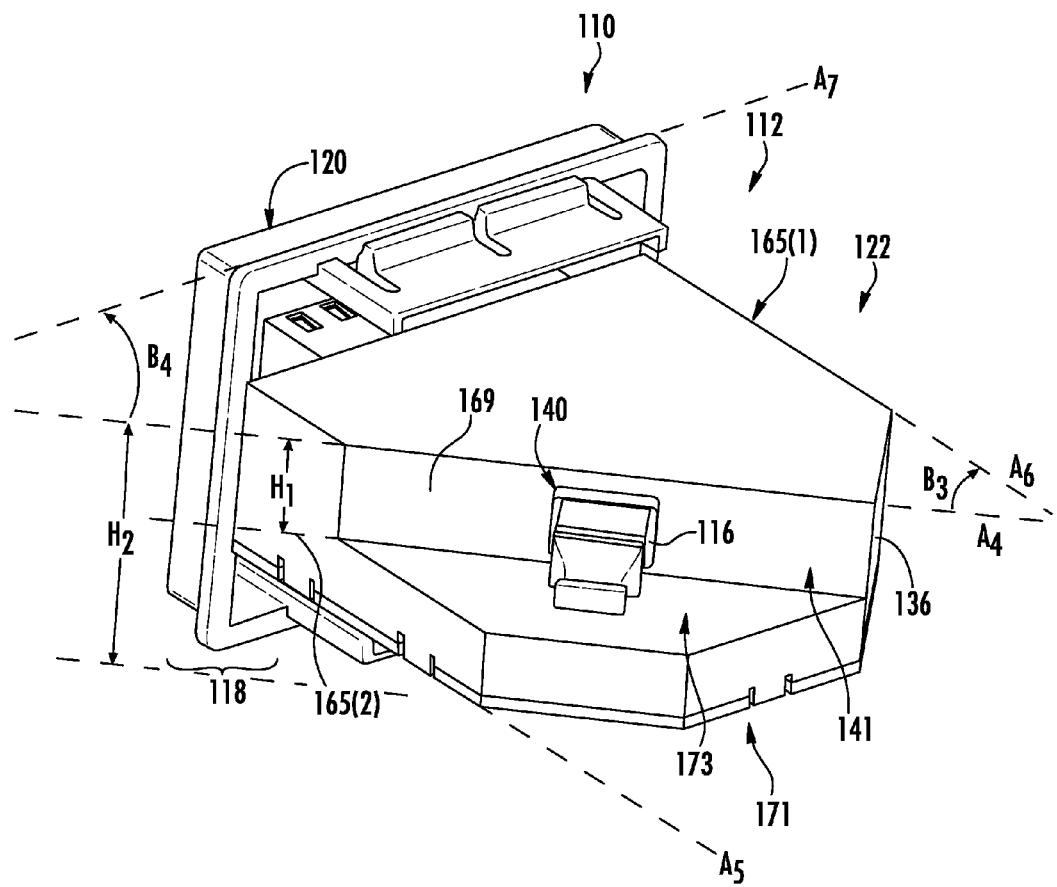
FIG. 13A is a rear, side perspective view of the convertible fiber optic panel/module assembly in FIG. 12.

If it is desired to provide the convertible fiber optic panel/module assembly 110 as the fiber optic module 112, as shown in FIG. 12, the panel body 120 is secured to the fiber optic module housing 122. In this regard, the panel body 120 of the fiber optic panel 118 is inserted into a module housing body 136 of the fiber optic module housing 122. The module housing body 136 may be a plastic molded part as a non-limiting example. In this regard, FIG. 13A is a rear, side perspective view of the convertible fiber optic panel/module assembly 110 in FIG. 12 to show additional detail of how the module fiber optic adapter 116 is provided in the fiber optic module 112. The module housing body 136 defines an internal cavity 138 (shown in FIG. 12) and a module fiber optic adapter opening 140 disposed in a rear side 141 of the module housing body 136. The module housing body 136 may be a plastic molded part as a non-limiting example. The module fiber optic adapter 116 may already be disposed in the module fiber optic adapter opening 140 of the module housing body 136 before the module housing body 136 receives the fiber optic panel 118. The fiber optic cable harness 124 is disposed in the internal cavity 138 to connect the module fiber optic adapter 116 to the panel fiber optic adapters 114(1)-114(6).

Figure 13B:
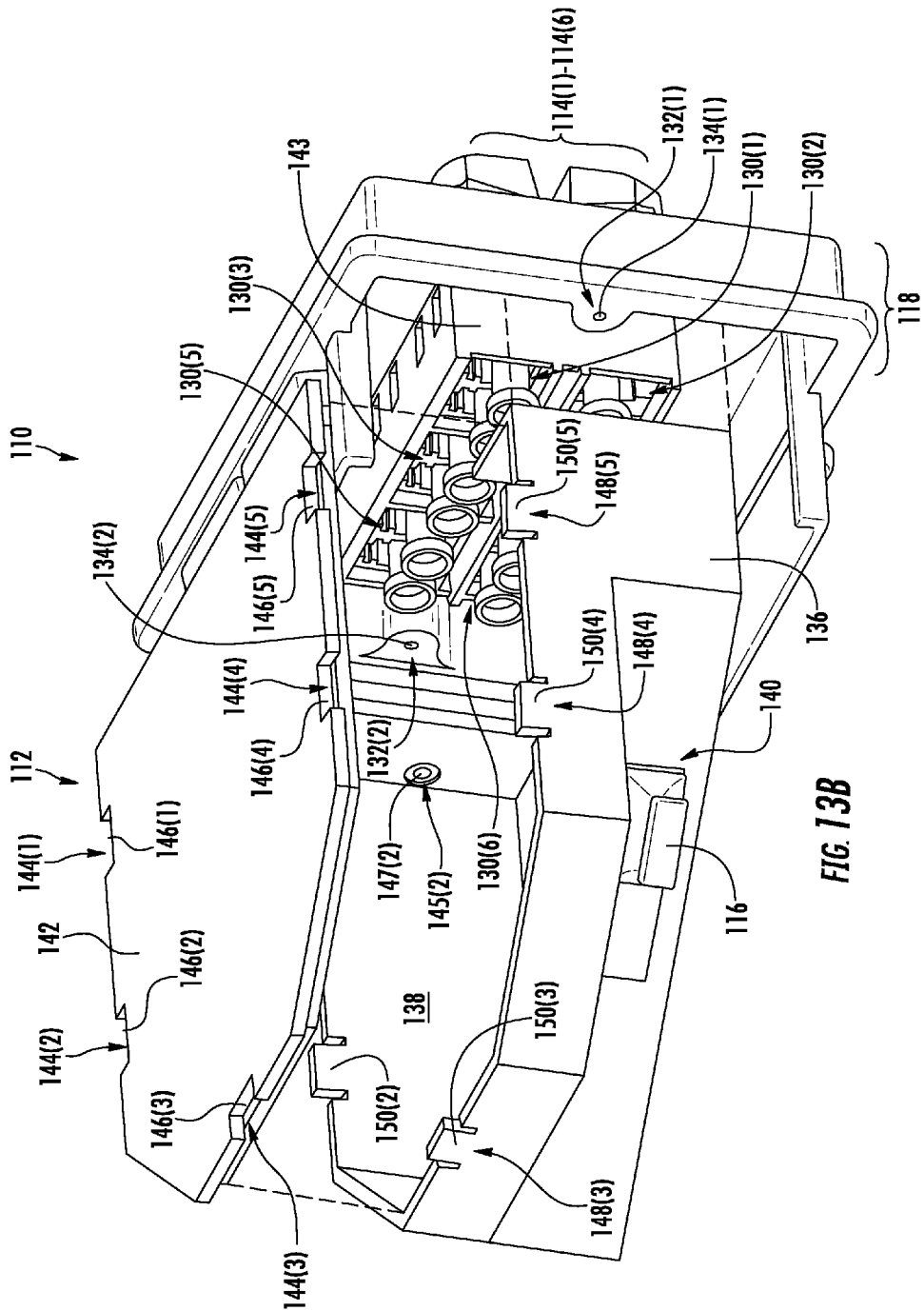
FIG. 13B is a rear, side perspective exploded view of the convertible fiber optic panel/module assembly in FIG. 13A.

FIG. 13B is a rear, side perspective exploded view of the convertible fiber optic panel/module assembly 110 in FIG. 13A to provide more detail. In this regard, the convertible fiber optic panel/module assembly 110 includes the fiber optic panel 118 as previously discussed above. The fiber optic panel 118 includes the panel body 120 that includes a plurality of panel fiber optic adapter openings 130 to receive and support the panel fiber optic adapters 114(1)-114(6) in the panel fiber optic adapter openings 130. The panel body 120 may be a plastic molded part as a non-limiting example. In this example, the panel fiber optic adapter openings 130 are provided within an opening support structure 143. In this example, the panel body 120 includes six (6) panel fiber optic adapter openings 130(1)-130(6) to receive the six (6) panel fiber optic adapters 114(1)-114(6).

Figure 14B:
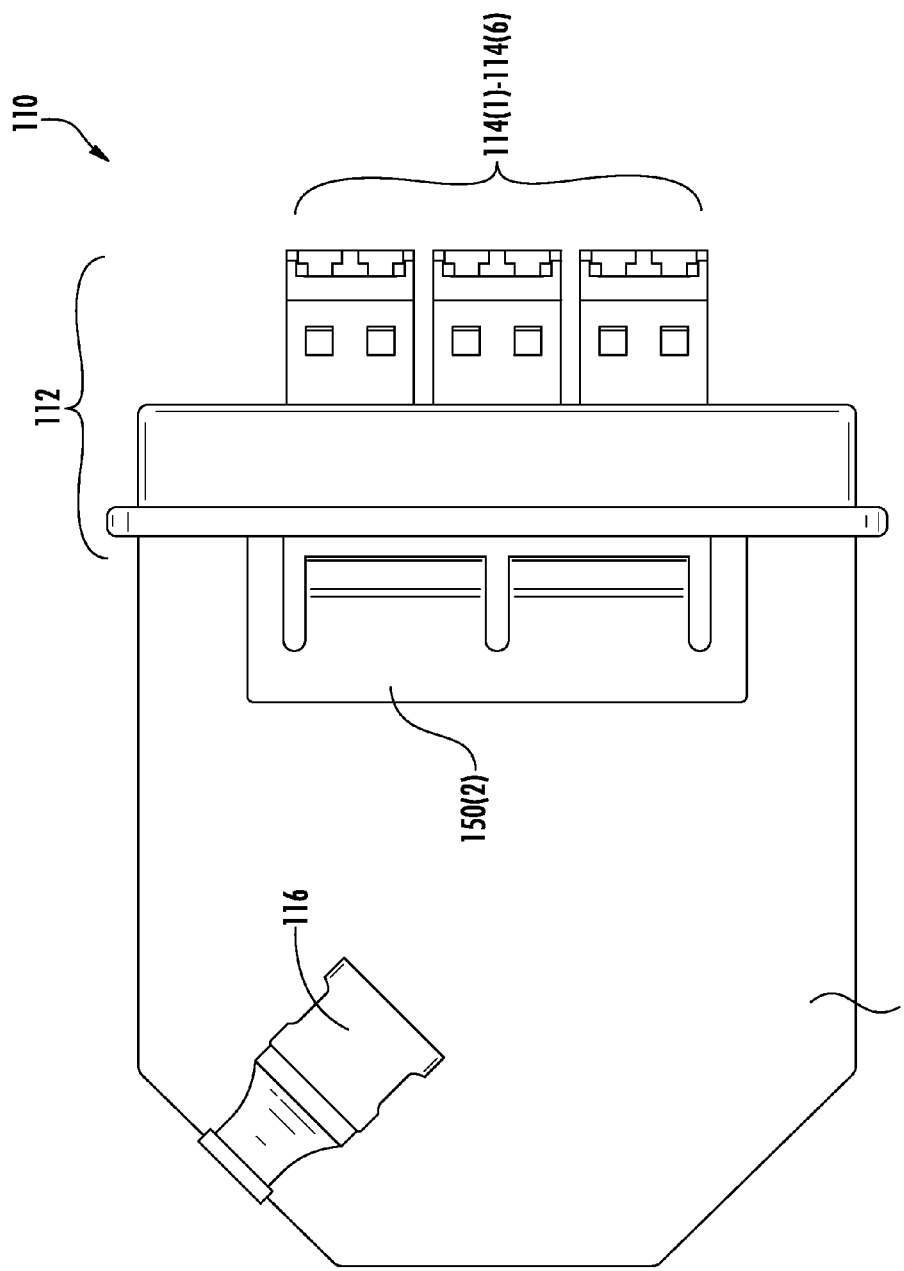
FIG. 14B is a bottom view of the fiber optic module assembly in FIG. 13B with the rear module housing body fitted with the module cover.
Figure 16:
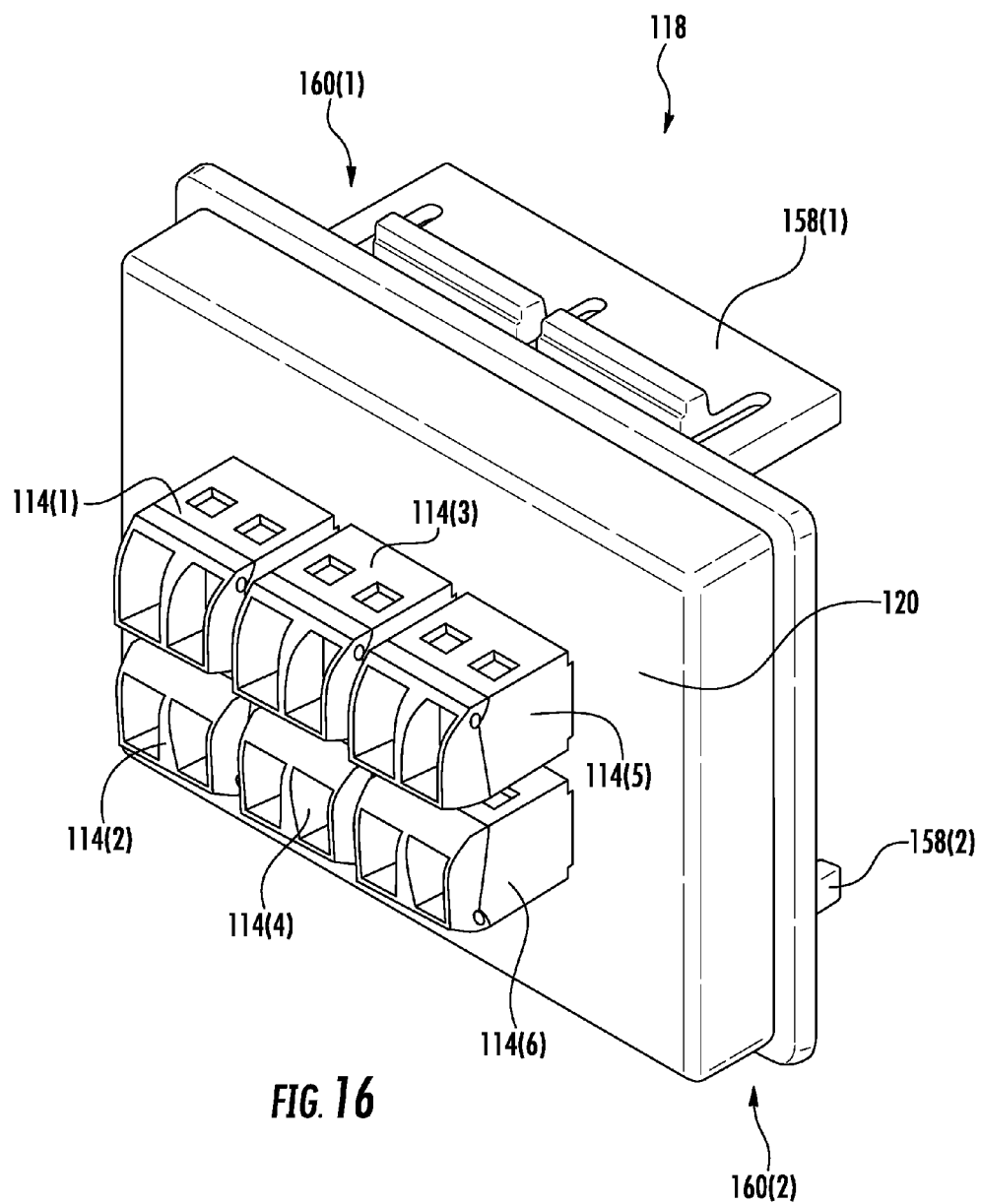
FIG. 16 is a front, side perspective view of the convertible fiber optic panel/module assembly in FIG. 12 provided as a fiber optic panel assembly and configured to be installed in a floor-mount or wall-mount junction box.
Figure 17:
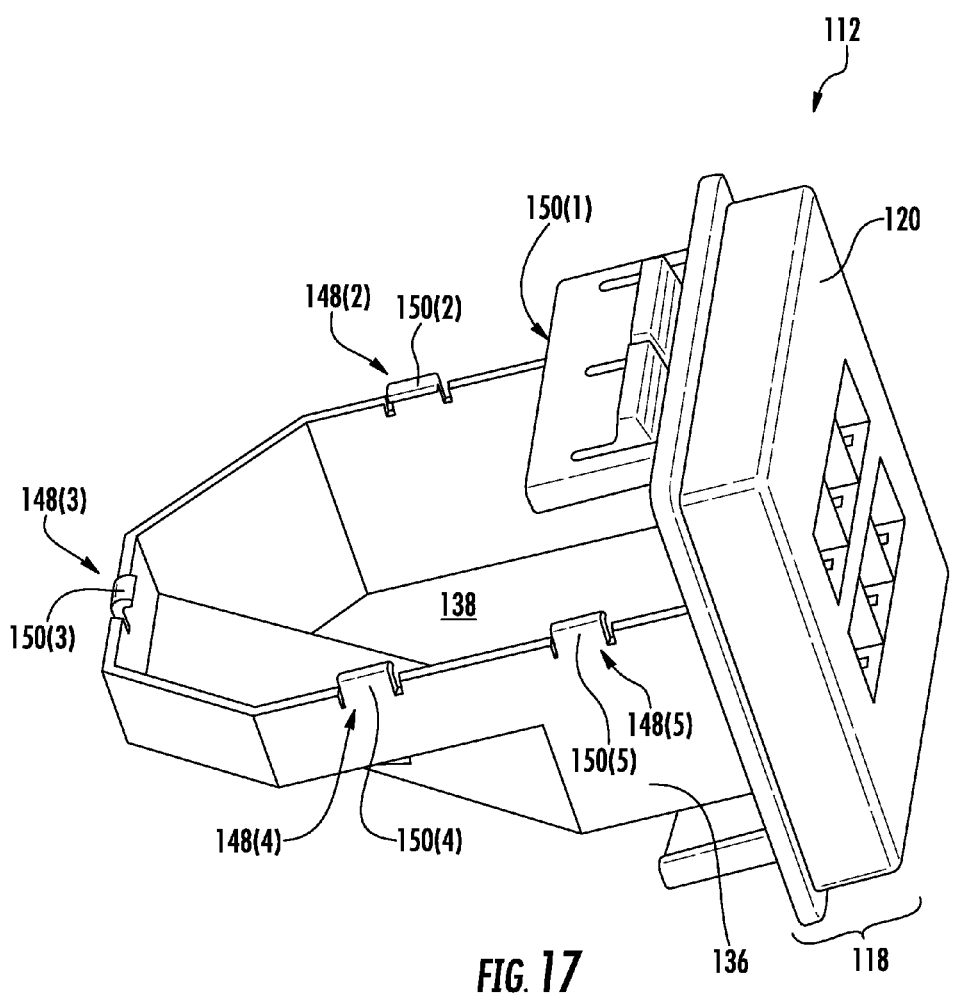
FIG. 17 is a front, side perspective view of the convertible fiber optic panel/module assembly in FIG. 12 fitted with a rear module housing with the cover module removed to provide the convertible fiber optic panel/module assembly as a fiber optic module assembly.

FIG. 14A is a top view of the fiber optic module 112 in FIG. 13B with the module housing body 136 fitted with the module cover 142. FIG. 14B is a bottom view of the fiber optic module 112 in FIG. 13B with the module housing body 136 fitted with the module cover 142. FIG. 15 is a rear view of the fiber optic module 112 in FIG. 13B. If it is desired to convert the fiber optic module 112 back to the fiber optic panel 118, the module housing body 136 can be removed from the panel body 120, as shown in FIG. 16.

With reference back to FIG. 13B, the panel body 120 also includes panel attachment members 132(1), 132(2) in the form of fastener openings 134(1), 134(2) in this example. The panel attachment members 132(1), 132(2) are configured to receive fasteners (not shown) that are first disposed through module housing attachment members 145(1), 145(2) provided in the module housing body 136 also in the form of fastener openings 147(1), 147(2) in this example (145(2) and 147(2) shown in FIG. 13B). In this manner, fasteners can be inserted through the fastener openings 144(1), 144(2) in the module housing body 136 and the fastener openings 134(1), 134(2) in panel body 120 when the module housing body 136 is arranged with respect to the panel body 120, as shown in FIG. 13B, and the fastener openings 147(1), 147(2) are aligned with fastener openings 134(1), 134(2). As an example, the fasteners may be self-tapping screws that are configured to self-tap the fastener openings 134(1), 134(2) in the panel body 120 to secure the module housing body 136 to the panel body 120 to provide the fiber optic module 112. The module fiber optic adapter 116 may already be disposed in the module fiber optic opening 140 of the module housing body 136 before the module housing body 136 is attached to the panel body 120.

With continuing reference to FIG. 13B, an optional module cover 142 can be provided and secured to the module housing body 136 to fully enclose the internal cavity 138 of the fiber optic module 112. To secure the module cover 142 to the module housing body 136, the module cover 142 contains module cover attachment members 144(1)-144(5) in the form of latch openings 146(1)-146(5) in this example. The latch openings 146(1)-146(5) are each configured to receive module cover housing attachment members 148(1)-148(5) in the form of latch fingers 150(1)-150(5) (148(1)-148(2), 150(1)-150(2) not shown in FIG. 13B) disposed in the module housing body 136 to secure the module cover 142 to the module housing body 136.

With reference back to FIG. 13A, to provide enhanced access to the module fiber optic adapter 116 for connecting a fiber optic connector thereto to provide fiber optic connectivity to the fiber optic module 112, in this example, the module fiber optic adapter opening 140 is disposed in the module housing body 136 at non-parallel and non-perpendicular angles. The module fiber optic adapter opening 140 is disposed at non-parallel angle $\beta_3$ along plane $A_4$ to planes $A_5$, $A_6$ of sides 165(1), 165(2), respectively, of the module housing body 136. Also in this example, the module fiber optic adapter opening 140 is disposed in the fiber optic module housing 122 at a non-perpendicular and non-parallel angle $\Gamma_4$ with respect to the plane $A_7$ of the panel body 120. Also in this example, the module fiber optic adapter opening 140 is disposed in a flat rear surface 169 in a rear 171 of a module housing body 136. The flat rear surface 169 is disposed between the sides 165(1), 165(2) of the module housing body 136. The flat rear surface 169 is a recessed surface that is under cut in the module housing body 136 from the side 165(2) and the rear 171 of the module housing body 136. The flat rear surface 169 only extends a partial height $H_1$ of the entire height $H_2$ of the module housing body 136. In this manner, open area 173 is formed by the disposition of the flat rear surface 169 to allow for enhanced access to the module fiber optic adapter 116 and for storage area for any slack fiber optic cable such that the fiber optic module 112 can still fit properly within a junction box.

Figure 18A:
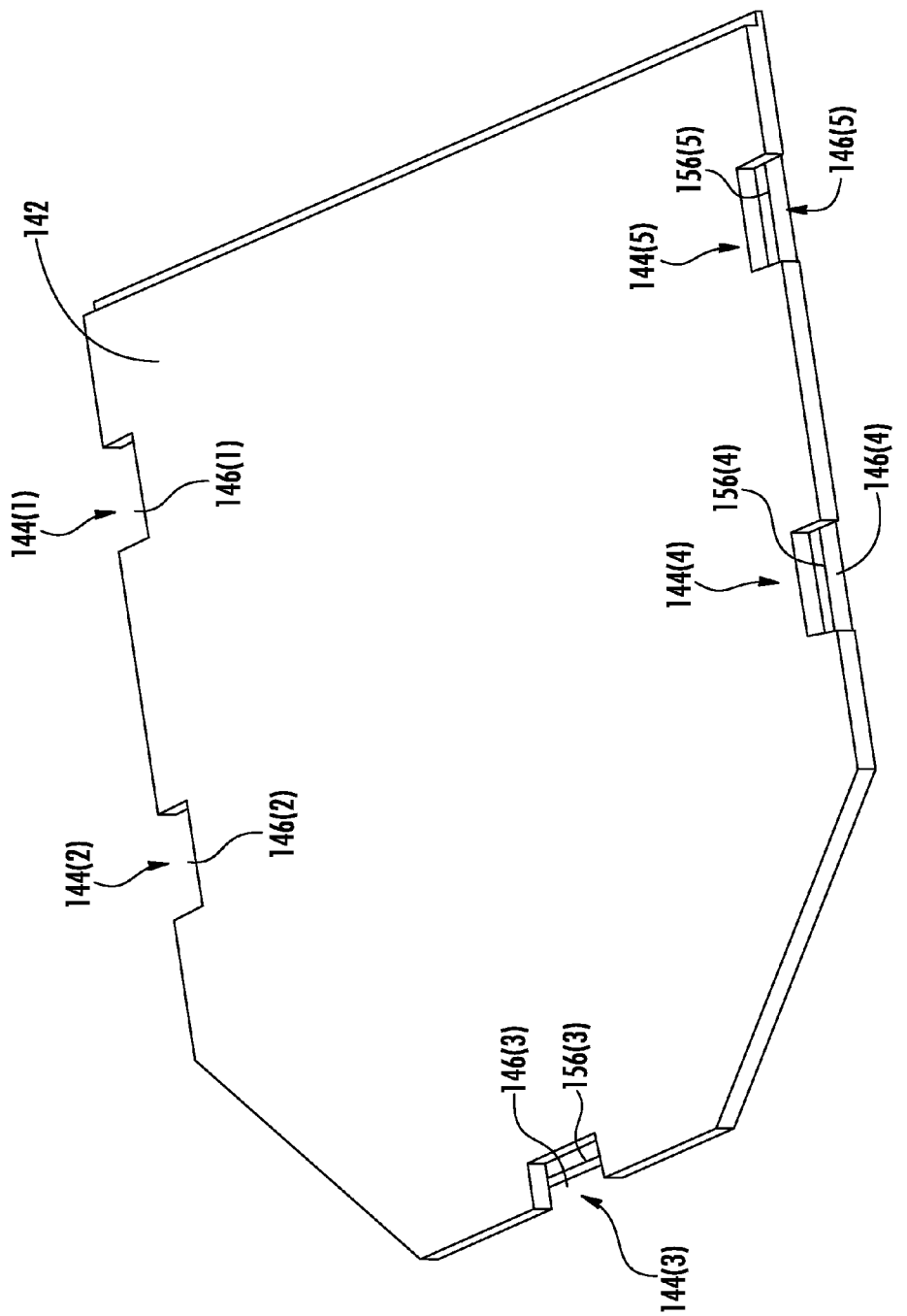
FIG. 18A is a top perspective view of a module cover configured to be disposed on the rear module housing of the fiber optic module assembly in FIG. 16.
Figure 18B:
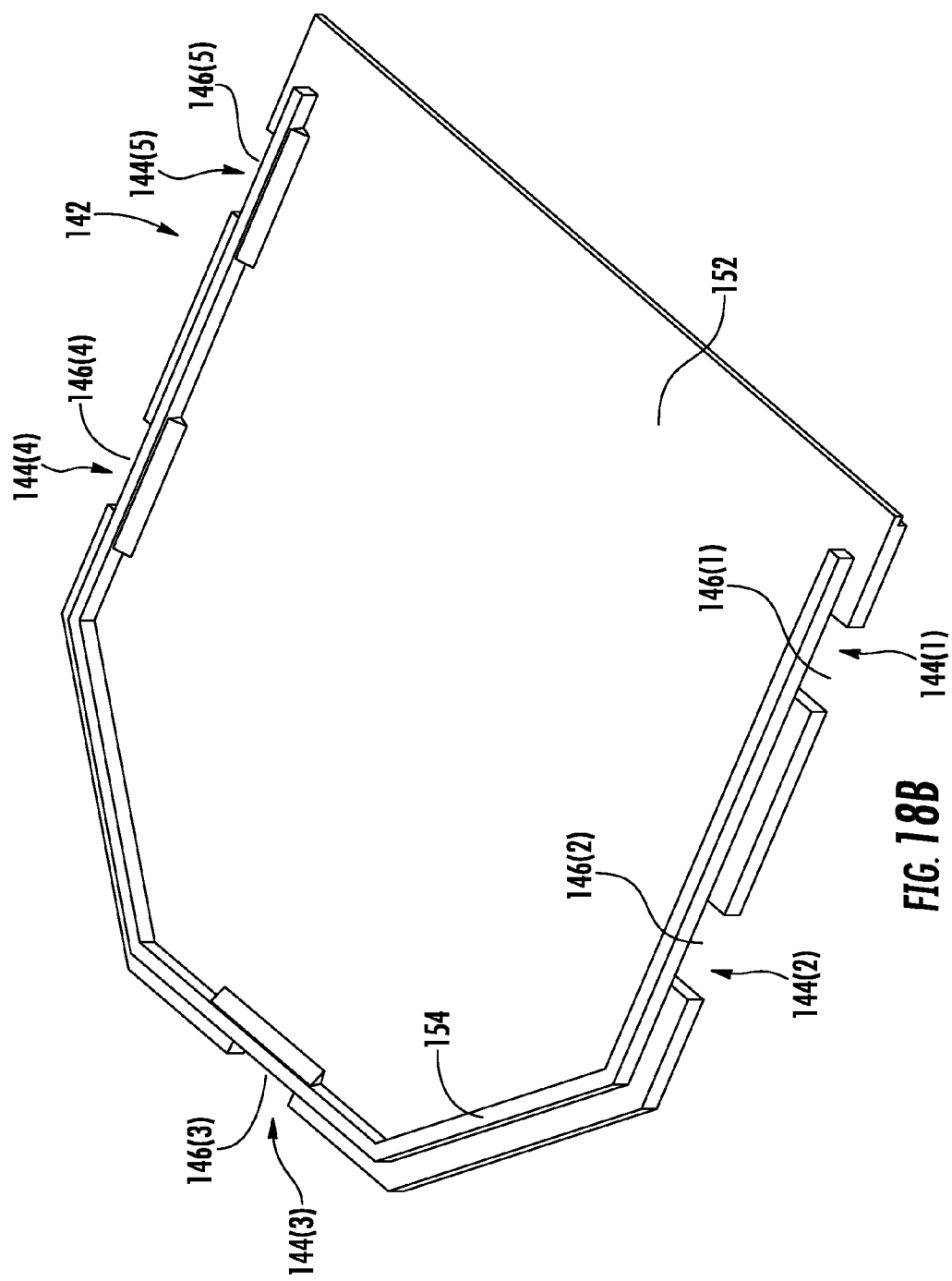
FIG. 18B is a bottom perspective view of the module cover in FIG. 18A.

FIGS. 18A and 18B are top and bottom perspective views, respectively, of the module cover 142. As shown in FIG. 18B, the bottom side 152 of the module cover 142, a sealing perimeter member 154 is shown disposed around the outside perimeter of the module cover 142 to seal the internal cavity 138 when the module cover 142 is secured to the module housing body 136. As shown in FIG. 18A, the sealing perimeter member 154 also provides surfaces 156(1)-156(5) (156(3)-156(5) shown in FIG. 18A) within the latch openings 146(1)-146(5) against which the latch fingers 150(1)-150(5) can be passed over when displaced and rest against when the latch fingers 150(1)-150(5) are returned back to their displaced position to secure the module cover 142 to the module housing body 136.

As discussed above, if the convertible fiber optic panel/module assembly 110 in FIG. 15 is desired to be provided as the fiber optic panel 118, and it is desired to floor- or wall-mount the fiber optic panel 118, the fiber optic panel 118 can be disposed in a floor-mount or wall-mount fiber optic panel bracket. In this regard, the fiber optic panel 118 assembly in FIG. 15 can be configured to be installed in a floor-mount fiber optic panel bracket, such as the floor-mounted fiber optic panel bracket 68 in FIGS. 5A and 5B, to be installable in a floor-mounted junction box as a floor-mount fiber optic panel assembly. In this regard, with reference back to FIG. 15, attachment members 158(1), 158(2) provided on opposite top and bottom sides 160(1), 160(2), respectively, of the panel body 120 are each configured to engage with complementary attachment members disposed in a floor-mount fiber optic panel bracket when the panel body 120 is inserted into a fiber optic panel opening of a floor-mount fiber optic panel bracket to provide a fiber optic panel assembly from the fiber optic panel 118. The fiber optic panel assembly with the fiber optic panel 118 can be mounted in a floor-mount junction box.

Further, if the fiber optic panel 118 in FIG. 15 is desired to be wall-mounted, the fiber optic panel 118 can be disposed in a wall-mount fiber optic panel bracket, like wall-mount fiber optic panel bracket 76 in FIGS. 6A and 6B. The panel body 120 can be disposed and secured within a fiber optic panel opening of a wall-mount fiber optic panel bracket to provide a wall-mount fiber optic panel assembly. The wall-mount fiber optic panel bracket with the fiber optic panel 118 disposed therein can be mounted in a wall-mount junction box to wall-mount the wall-mount fiber optic panel assembly containing the fiber optic panel 118. In this regard, with reference back to FIG. 15, the attachment members 158(1), 158(2) provided on the opposite top and bottom sides 160(1), 160(2), respectively, of the panel body 120 can also be configured to engage with complementary attachment members disposed in a wall-mount fiber optic panel bracket when the panel body 120 is inserted into a fiber optic panel opening of a wall-mount fiber optic panel bracket to provide a floor-mount fiber optic panel assembly from the fiber optic panel 118. The floor-mount fiber optic panel assembly with the fiber optic panel 118 can be mounted in a floor-mount junction box.

Further, as also discussed above, if the convertible fiber optic panel/module assembly 110 in FIGS. 13A and 13B is desired to be provided as the fiber optic module 112, and it is desired to floor- or wall-mount the fiber optic module 112, the fiber optic module 112 can be disposed in a floor-mount or wall-mount fiber optic panel bracket. In this regard, the fiber optic module 112 can be configured to be installed in the floor-mount fiber optic panel bracket 68 in FIGS. 7A and 7B to be installable with a floor-mounted junction box. In this regard, with reference back to FIG. 15, the module housing body 136 can be friction fitted in the floor-mount fiber optic panel bracket 68. The fiber optic module assembly comprising the fiber optic module 112 installed in the floor-mount fiber optic panel bracket 68 can then be mounted in a floor-mount junction box.

Further, if it is desired to wall-mount the fiber optic module 112, the fiber optic module 112 can be disposed in a wall-mount fiber optic panel bracket. In this regard, the fiber optic module 112 can be configured to be installed in the wall-mount fiber optic panel bracket 76 in FIGS. 9A and 9B. In this regard, with reference back to FIG. 15, the module housing body 136 can be friction fitted in the wall-mount fiber optic panel bracket 76. The fiber optic module assembly comprising the fiber optic module 112 installed in the wall-mount fiber optic panel bracket 76 can then be mounted in a wall-mount junction box.

Also, if the convertible fiber optic panel/module assembly 110 in FIG. 12 provided as the fiber optic module 112 can also be floor-mounted or wall-mounted. The module housing body 136 of the fiber optic module 112 can be provided in either a floor-mount or wall-mount fiber optic bracket just as previously discussed above if the convertible fiber optic panel/module assembly 110 in FIG. 12 was provided as the fiber optic panel 118.

Additional features and modifications are contemplated as well. For example, the components disclosed herein for the convertible fiber optic panel/module assemblies may be molded or cut parts. The convertible fiber optic panel/module assemblies provided as a fiber optic module may be designed for single fiber or multi-fiber fiber optic connectivity. The convertible fiber optic panel/module assemblies may be configured to be mounted in other fixtures other than floors and walls, if desired. The attachment members disclosed herein for convertible fiber optic panel/module assemblies could be other types of attachment devices other than latches, latch openings, and fastener openings, including but not limited to plungers and plunger openings, grommets, and dovetail sides.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A convertible fiber optic panel/module assembly, comprising:
   a fiber optic panel bracket comprised of a fiber optic panel opening, the fiber optic panel bracket configured to be mounted in a junction box;
   a fiber optic panel, comprising:
      a panel body comprising one or more panel fiber optic adapter openings;
      one or more panel fiber optic adapters disposed in the one or more panel fiber optic adapter openings in the panel body;

the panel body further comprising at least one panel attachment member configured to engage with at least one complementary attachment member disposed in the fiber optic panel bracket when the panel body is inserted into the fiber optic panel opening to provide a fiber optic panel assembly; and a fiber optic module housing, comprising:
   a module housing body defining an internal cavity and comprising at least one module fiber optic adapter opening;
   at least one module fiber optic adapter disposed in the at least one module fiber optic adapter opening in the module housing body;
   at least one fiber optic cable harness disposed in the internal cavity, the at least one fiber optic cable harness having a first end connected to at least one module fiber optic adapter and a second end configured to be connected to the one or more panel fiber optic adapters; and
   the module housing body further comprising at least one module housing attachment member configured to engage with the at least one panel attachment member of the fiber optic panel assembly to convert the fiber optic panel to a fiber optic module assembly.

2. The convertible fiber optic panel/module assembly of claim 1, wherein the at least one module fiber optic adapter opening is disposed in a rear side of the module housing body.

3. The convertible fiber optic panel/module assembly of claim 2, wherein the at least one module fiber optic adapter opening is further disposed at an angle to sides of the fiber optic module housing and at an angle to a front plane of the fiber optic panel.

4. The convertible fiber optic panel/module assembly of claim 1, wherein the at least one module fiber optic adapter opening is disposed in the fiber optic module housing at an angle to a front plane of the fiber optic panel.

5. The convertible fiber optic panel/module assembly of claim 2, wherein the at least one module fiber optic adapter opening is disposed in a rear side of the fiber optic module housing at an angle to sides of the fiber optic module housing and at an angle to a front plane of the fiber optic panel.

6. The convertible fiber optic panel/module assembly of claim 1, wherein the at least one panel attachment member is comprised of at least one attachment member comprised from the group consisting of at least one latch, at least one latch opening, at least one plunger, at least one plunger opening, at least one fastener, and at least one fastener opening, at least one grommet, and at least one dovetail side.

7. The convertible fiber optic panel/module assembly of claim 1, wherein the at least one module housing attachment member is comprised of at least one attachment member comprised from the group consisting of at least one latch, at least one latch opening, at least one plunger, at least one plunger opening, at least one fastener, at least one fastener opening, at least one grommet, and at least one dovetail side.

8. The convertible fiber optic panel/module assembly of claim 1, further comprising at least one front side access opening disposed on a front side of the panel body, the at least one front side access opening configured to receive a pulling member to remove the panel body from the fiber optic panel bracket.

9. The convertible fiber optic panel/module assembly of claim 1, wherein:
   the fiber optic module housing further comprises a module cover comprising at least one module cover attachment member; and
   the module housing body comprises at least one module housing cover attachment member configured to engage with the at least one module cover attachment member in the module cover to secure the module cover to the module housing body.

10. The convertible fiber optic panel/module assembly of claim 1, wherein the fiber optic panel bracket is configured to be mounted in a floor-mounted junction box.

11. The convertible fiber optic panel/module assembly of claim 1, wherein the fiber optic panel bracket is configured to be mounted in a wall-mounted junction box.

12. The convertible fiber optic panel/module assembly of claim 1, wherein the at least one module fiber optic adapter opening is disposed in a curved rear surface of the module housing body.

13. The convertible fiber optic panel/module assembly of claim 11, wherein the curved rear surface of the module housing body is disposed between a first side of the module housing body and a second side of the module housing body opposite of the first side of the module housing body.

14. The convertible fiber optic panel/module assembly of claim 12, wherein the curved rear surface of the module housing body is further disposed in a center of the module housing body between the first side of the module housing body and the second side of the module housing body.

15. The convertible fiber optic panel/module assembly of claim 1, wherein the the at least one panel attachment member is comprised of at least one latch finger configured to be received in the at least one module housing attachment member comprised of at least one latch finger opening, to secure the module housing body to the panel body to convert the fiber optic panel to the fiber optic module assembly.

16. The convertible fiber optic panel/module assembly of claim 1, wherein the at least one module fiber optic adapter opening is disposed in a rear surface of the module housing body angled to a front plane of the panel body.

17. The convertible fiber optic panel/module assembly of claim 1, wherein the at least one module fiber optic adapter opening is disposed in a recessed surface from a rear surface of the module housing body, the recessed surface located between a front plane of the panel body and a rear side of the module housing body.

18. The convertible fiber optic panel/module assembly of claim 17, wherein the recessed surface is angled to the front plane of the panel body and angled to a rear plane of the rear side of the module body housing.

\* \* \* \* \*